(12) United States Patent
Heard

(10) Patent No.: US 6,899,374 B1
(45) Date of Patent: May 31, 2005

(54) MULTIPLE DOOR COUPE

(76) Inventor: Nathaniel Heard, 7556 Colony Palm Dr., Boynton Beach, FL (US) 33436

( * ) Notice: Subject to any disclaimer, the term of this patent is extended or adjusted under 35 U.S.C. 154(b) by 0 days.

(21) Appl. No.: 09/982,134

(22) Filed: Oct. 18, 2001

Related U.S. Application Data

(60) Provisional application No. 60/242,163, filed on Oct. 20, 2000.

(51) Int. Cl.[7] .................................................. B60P 5/06
(52) U.S. Cl. ...................................................... 296/155
(58) Field of Search ........................... 296/155, 146.11, 296/146.12; 49/254, 209, 218, 219, 221, 223, 225

(56) References Cited

U.S. PATENT DOCUMENTS

| | | | | |
|---|---|---|---|---|
| 4,025,104 A | * | 5/1977 | Grossbach et al. | 296/155 |
| 4,561,690 A | * | 12/1985 | Shinjo et al. | 296/155 |
| 5,398,988 A | * | 3/1995 | DeRees et al. | 296/155 |
| 6,183,039 B1 | * | 2/2001 | Kohut et al. | 296/155 |

* cited by examiner

*Primary Examiner*—Lori L. Coletta
(74) *Attorney, Agent, or Firm*—Daniel S. Polley, P.A.

(57) ABSTRACT

An automobile, in particular those considered as a Personal Luxury Car, Performance Car, "Pony Car"/Sports Car, or Grand Touring car, that seems as a two door coupe, by appearing to have only left and right front doors, but in actuality has four doors; where the left and right rear doors are "hidden", and appear as solid rear quarter panels, but have selective hinge points or pivot points along the roof line or at the rear bumper/tail/light/trunk area, or at some location that allows the rear quarter panel, to move away from the car's rear seating area and provide passenger entry/exit.

20 Claims, 25 Drawing Sheets

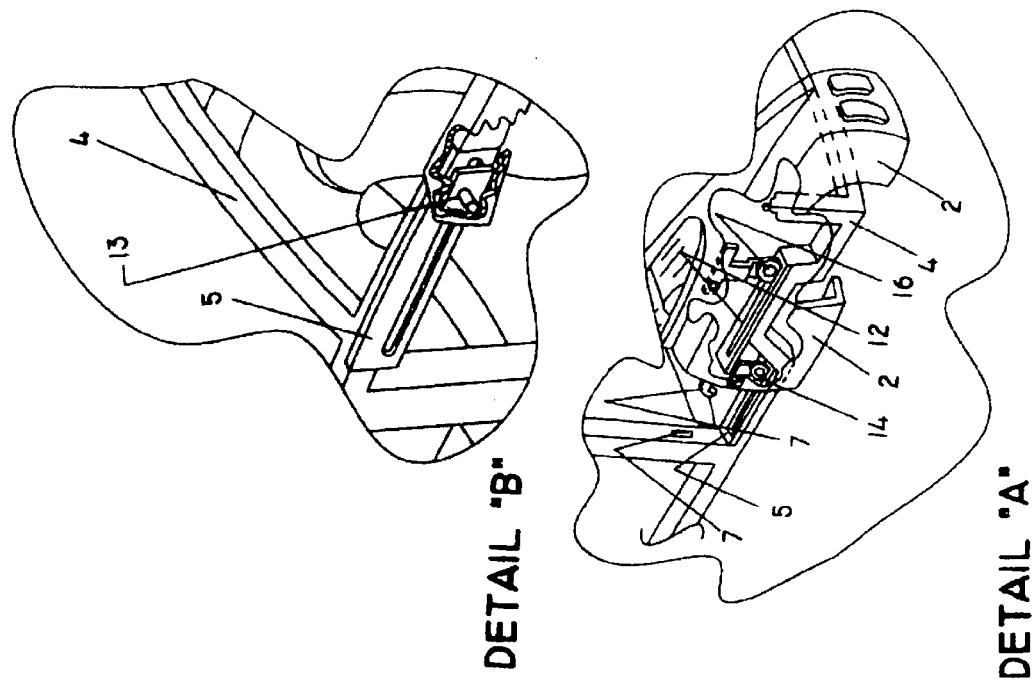
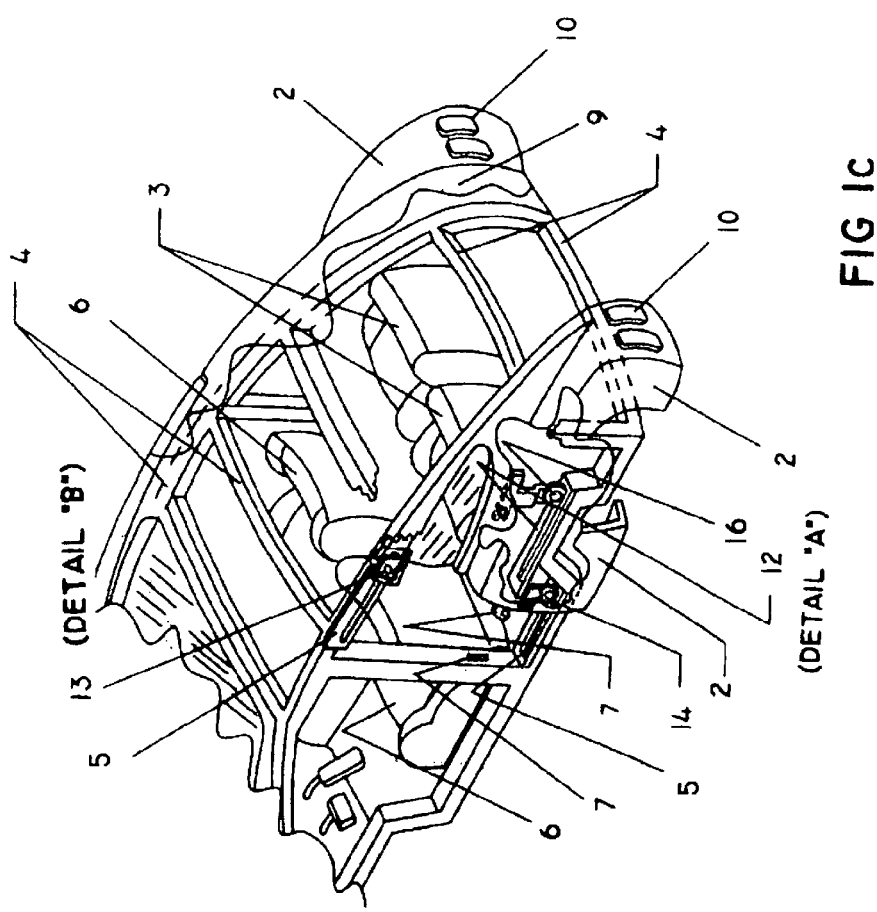

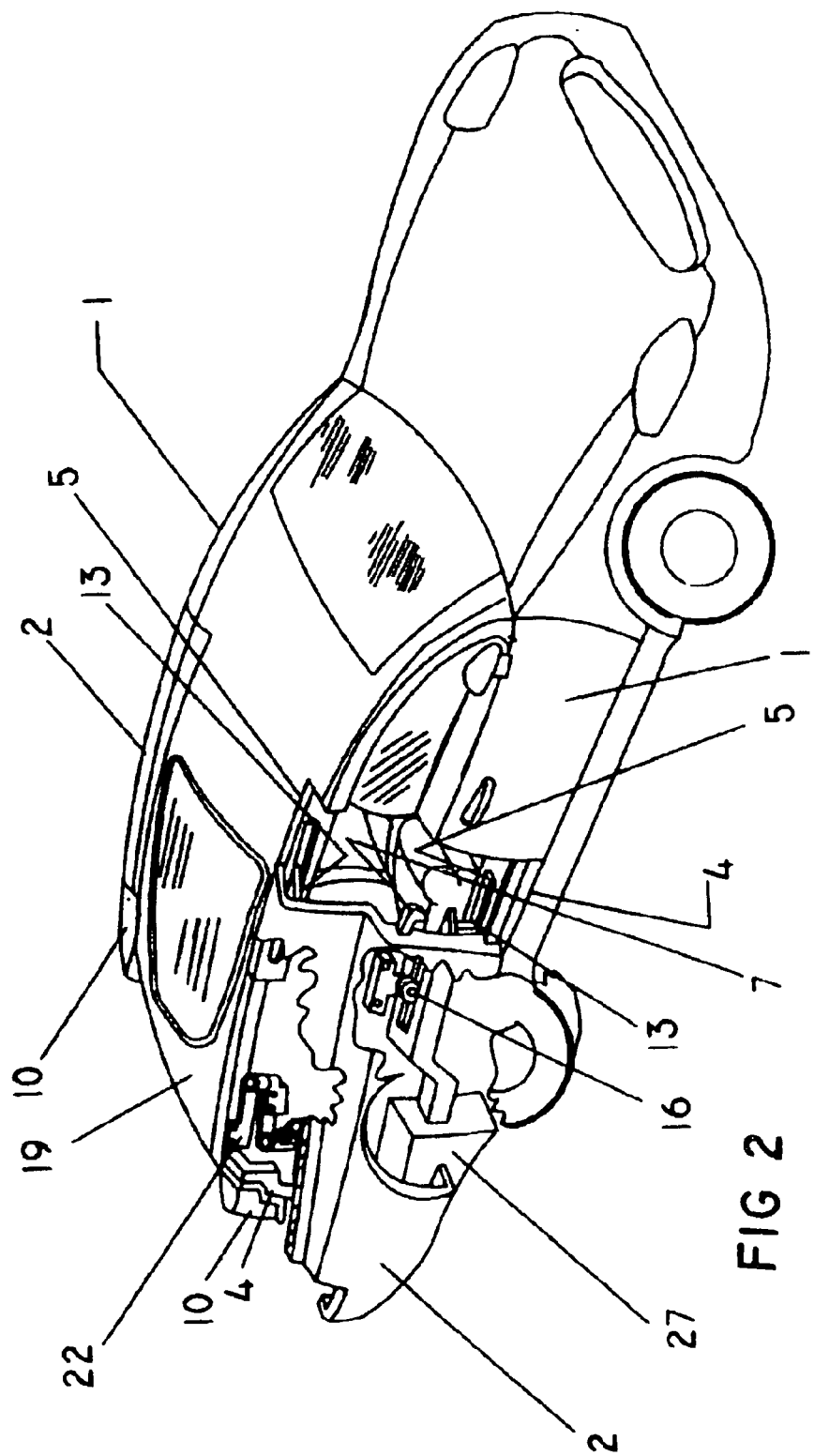

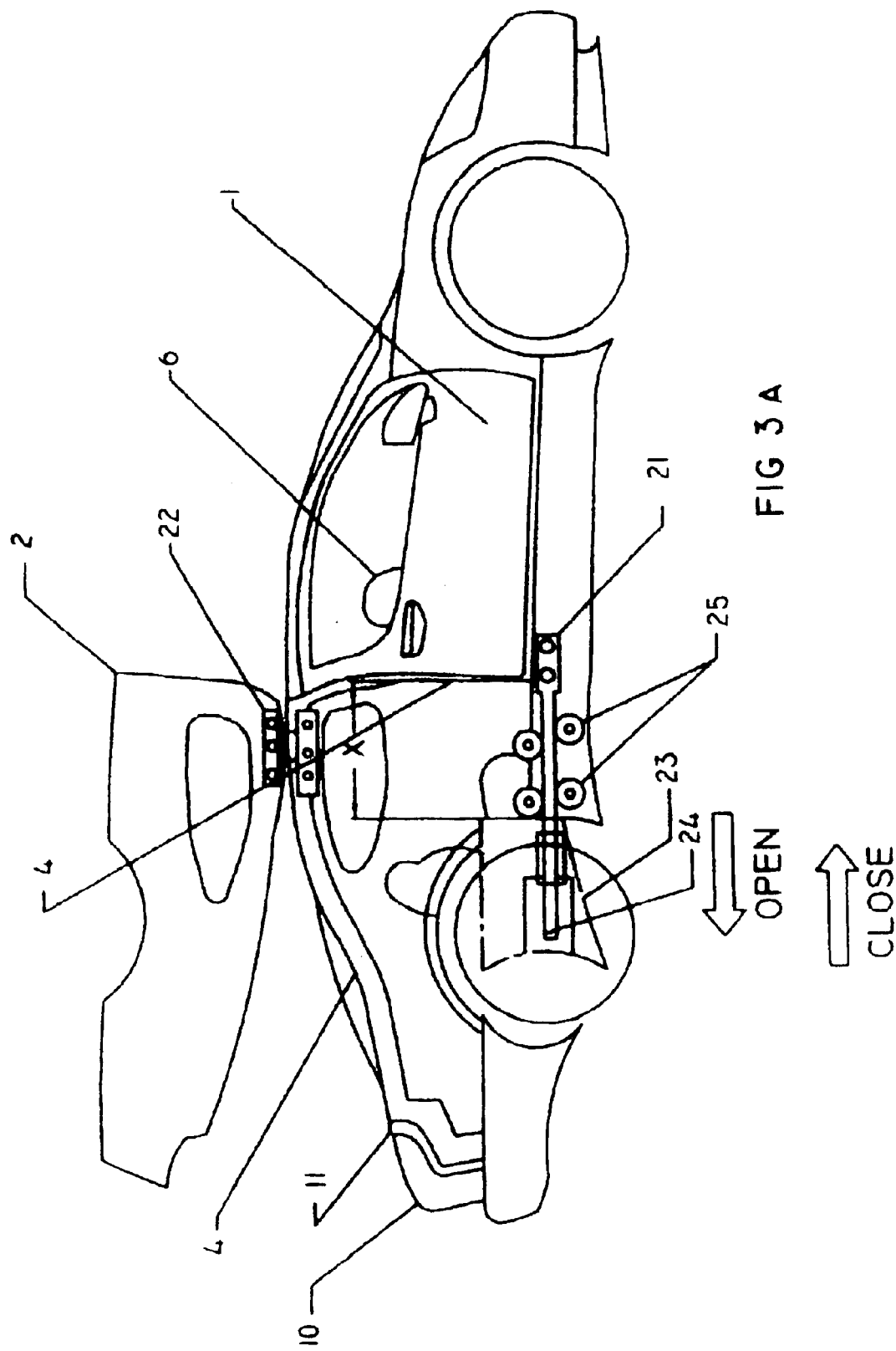

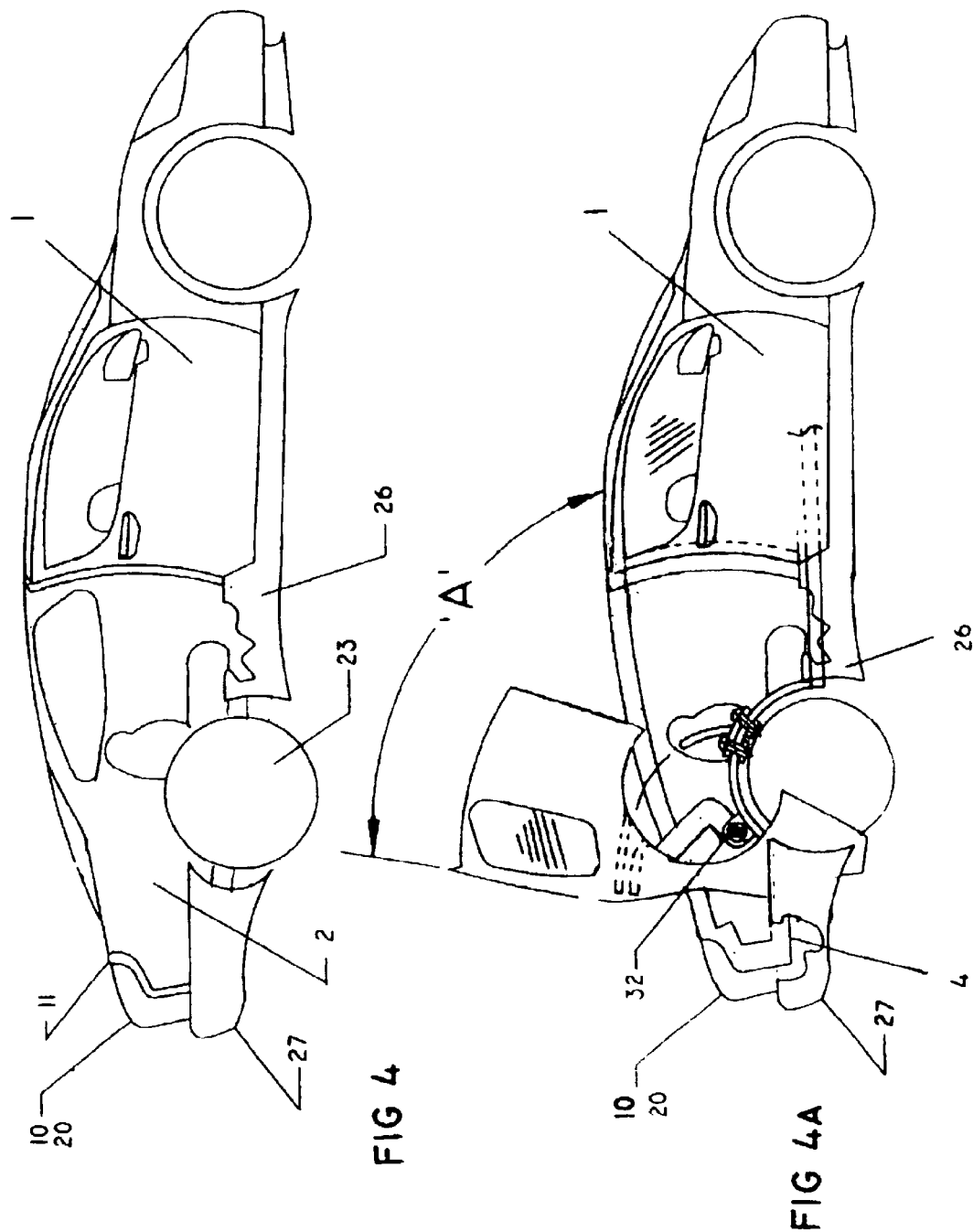

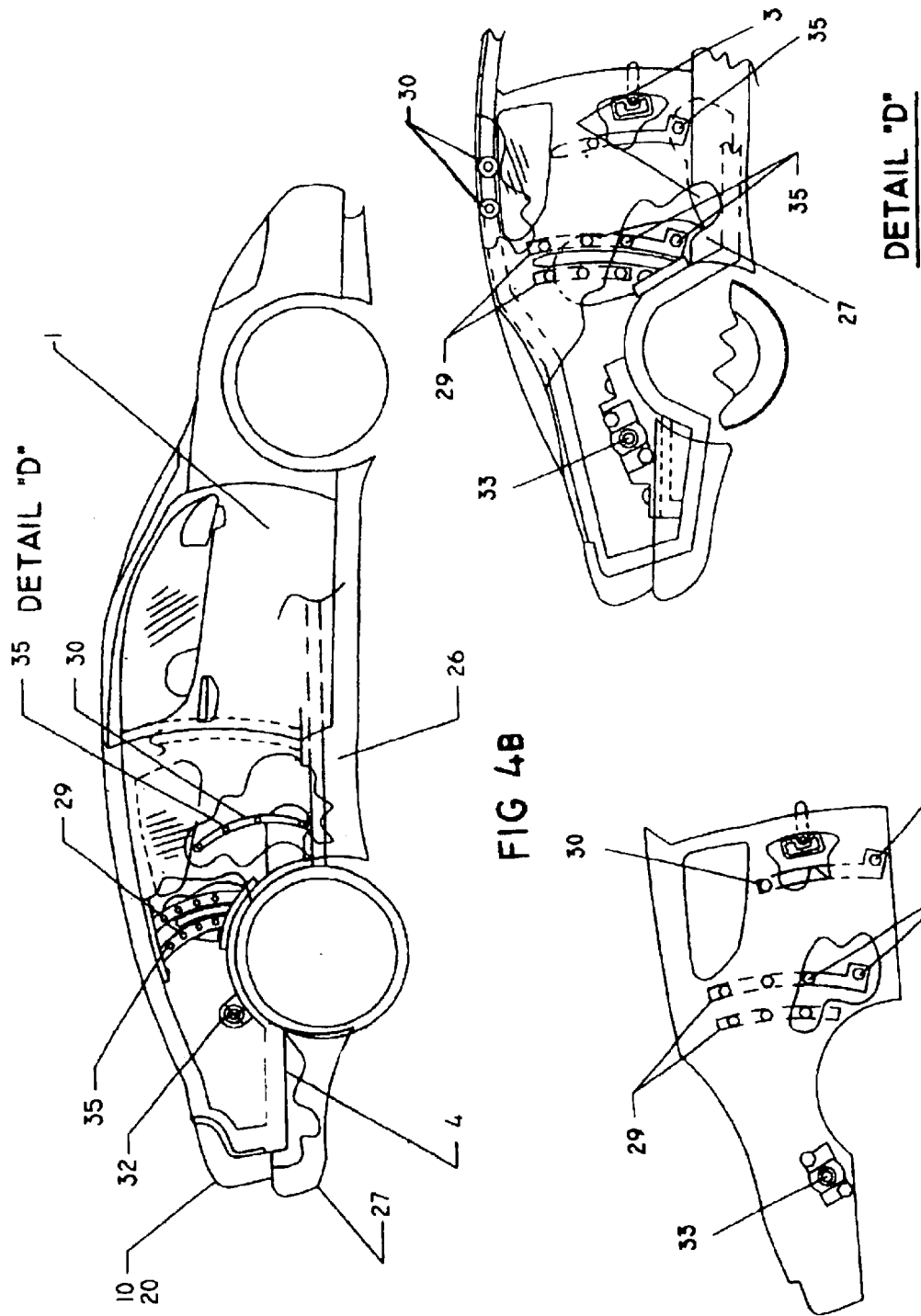

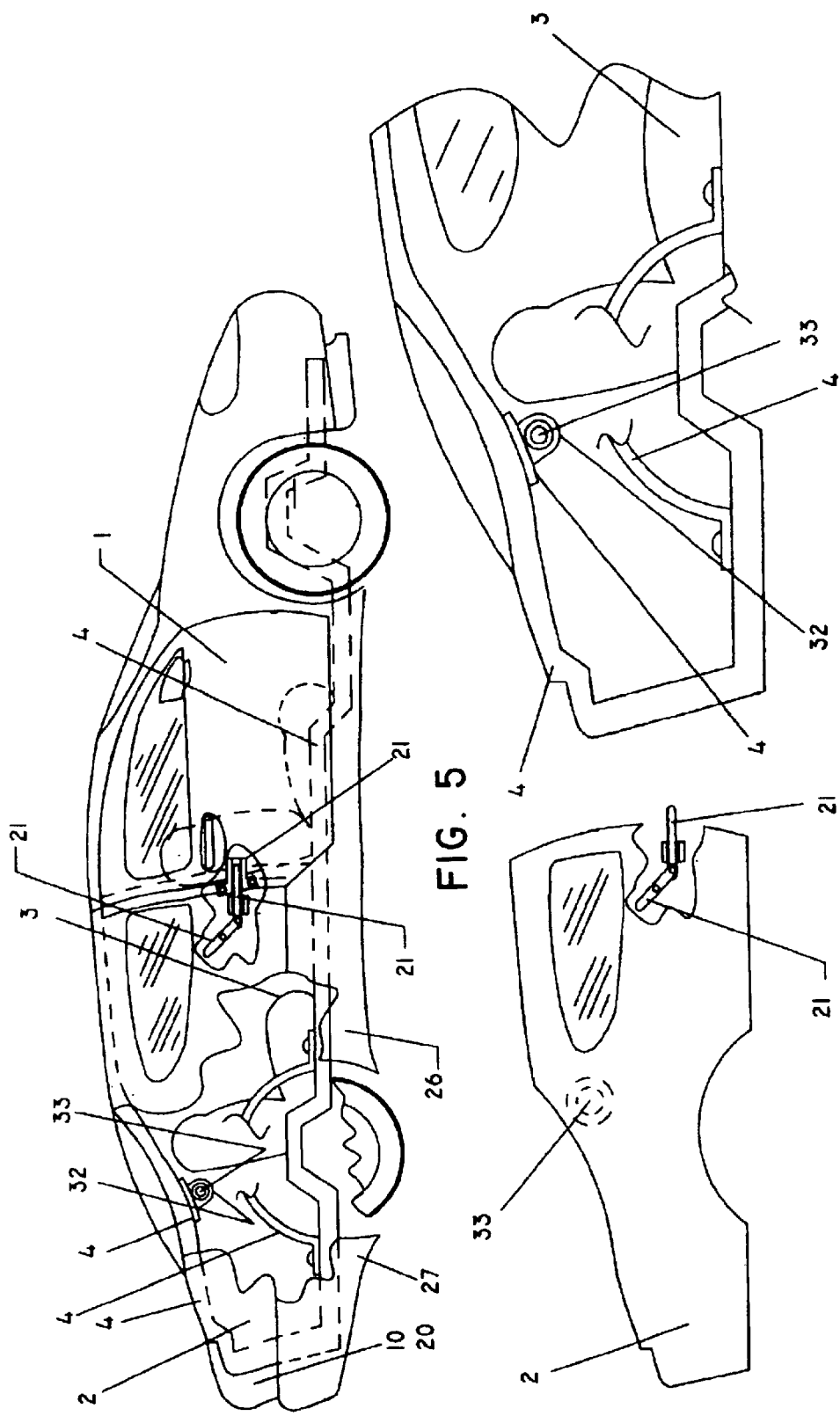

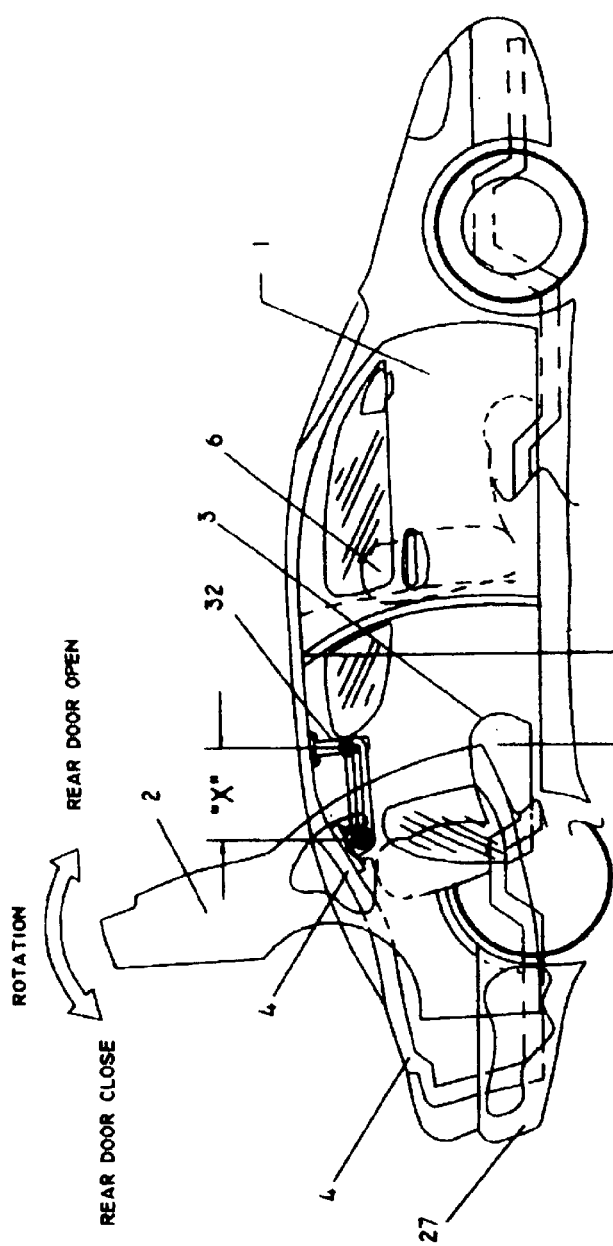
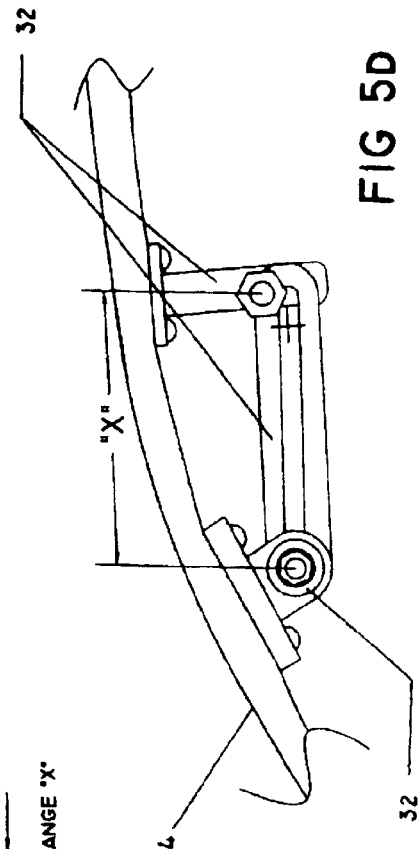
FIG 5C
FIG 5D

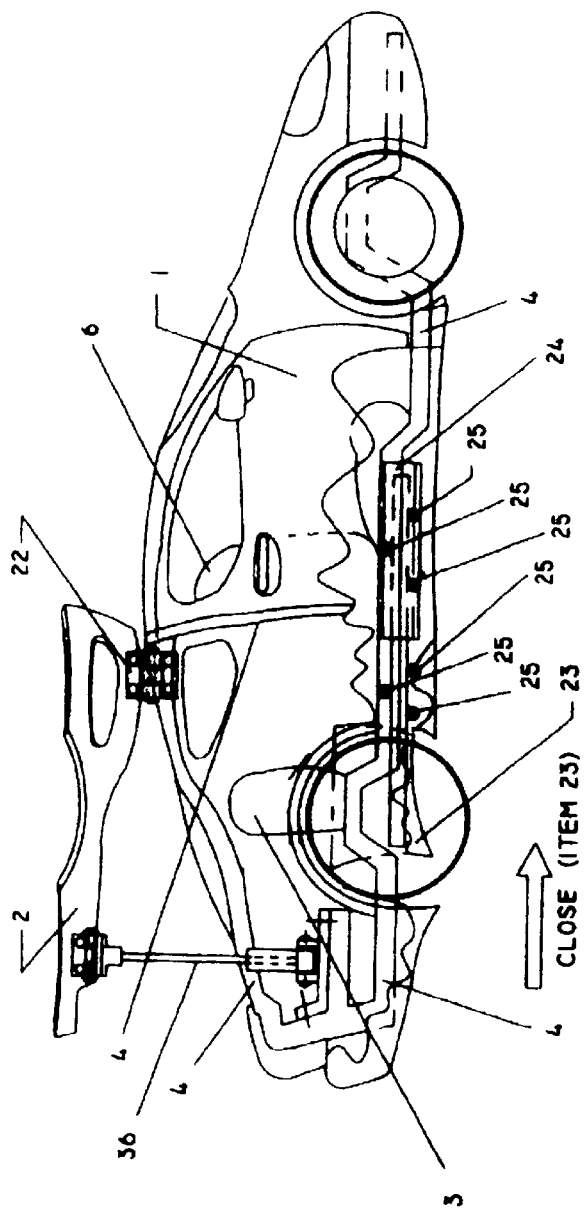
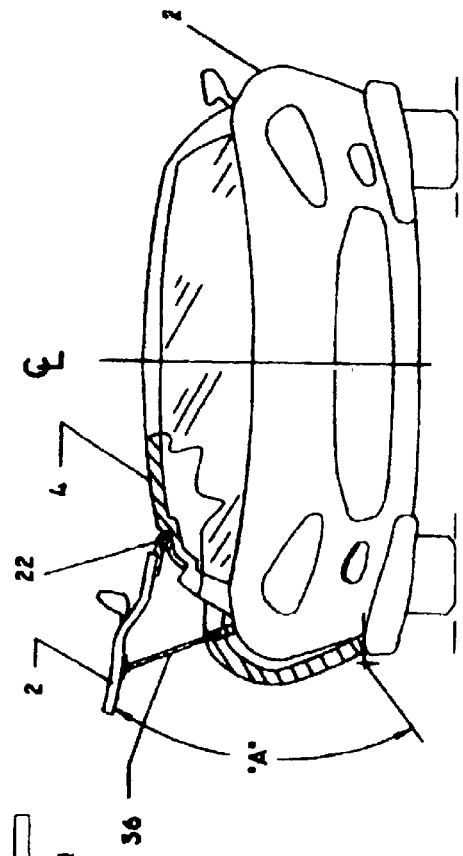
FIG 6
FIG 6A

DETAIL "C"

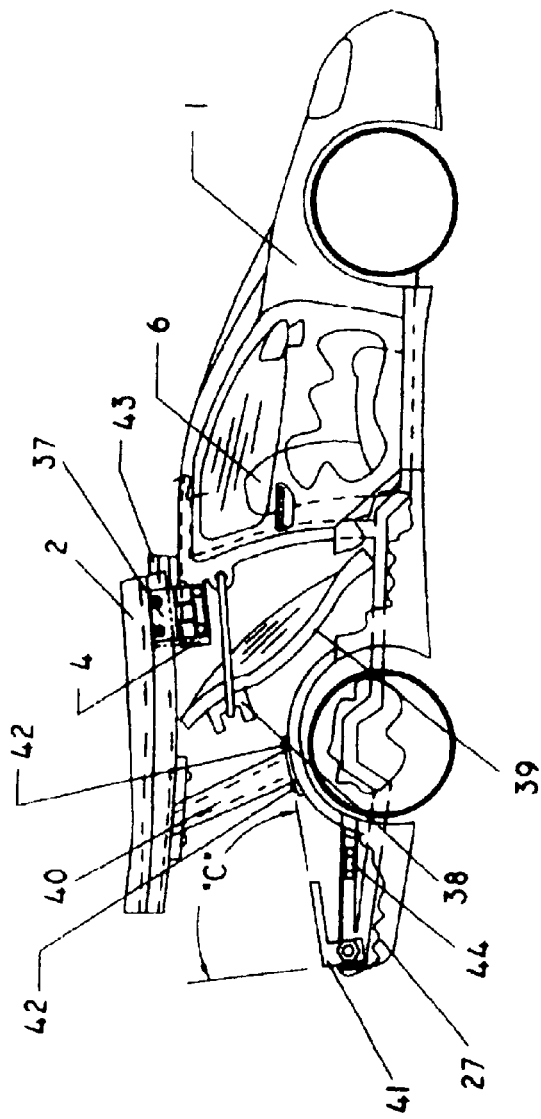
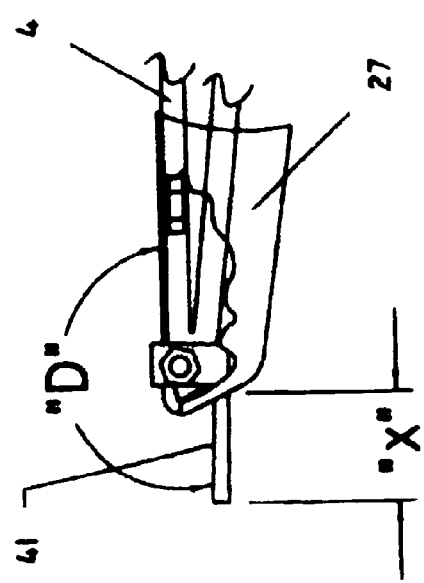
FIG 7
FIG 7A

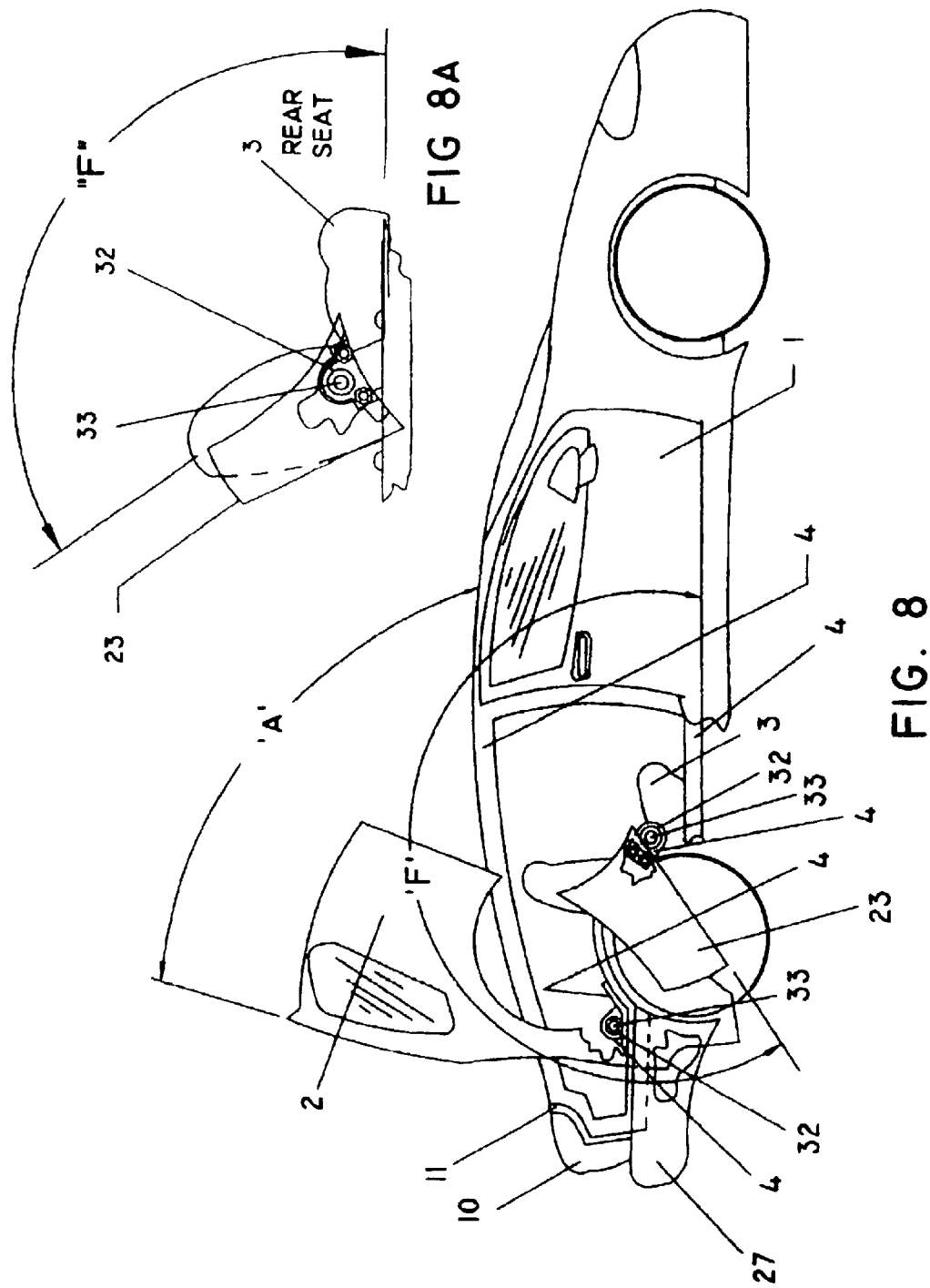

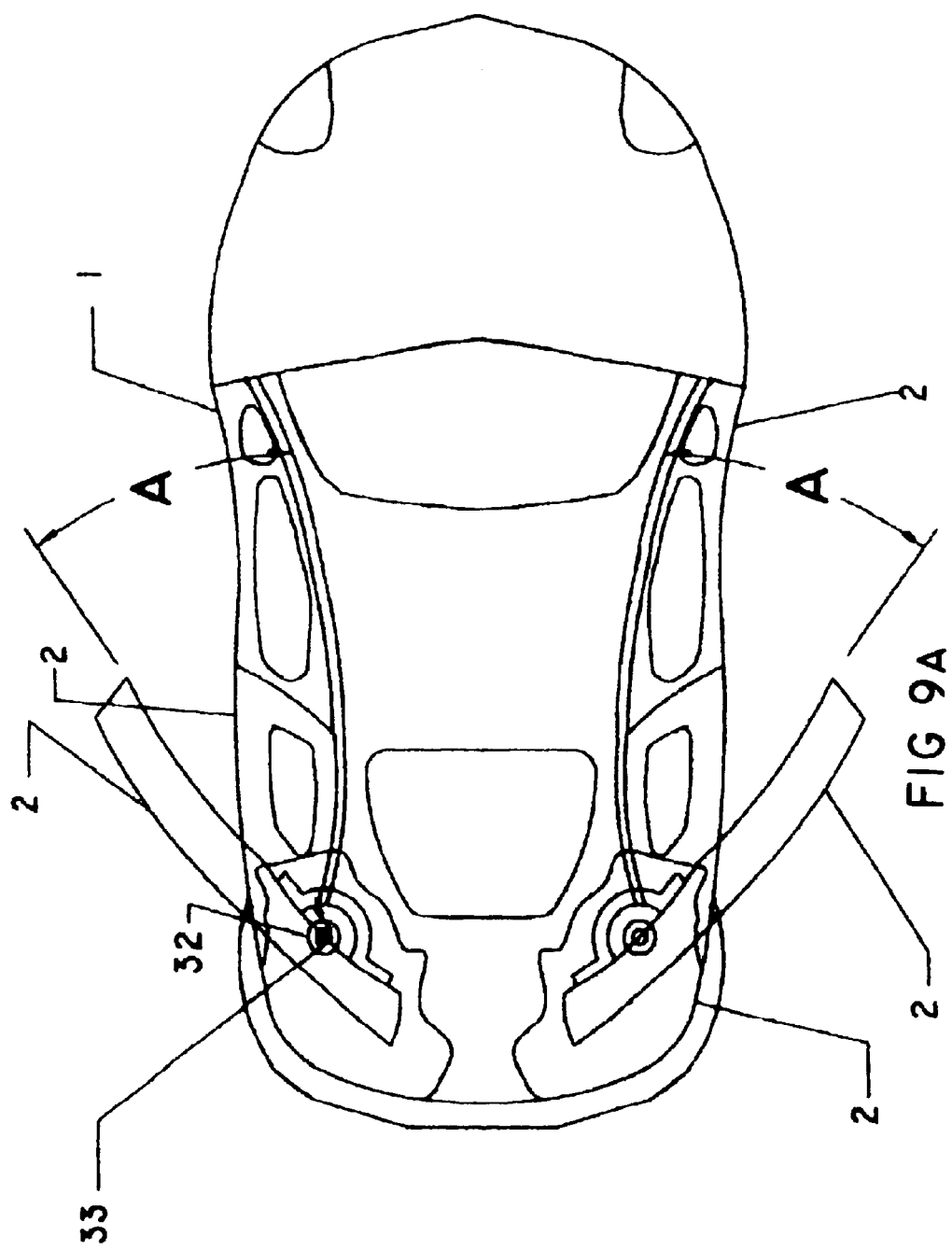

MULTIPLE DOOR COUPE

This application claims priority to and the benefit of U.S. Application Ser. No. 60/242,163, filed Oct. 20, 2000.

BACKGROUND OF THE INVENTION

1. Field of the Invention

The invention refers to an automobile that appears as a two door coupe, but has two rear doors that extend to the rear of the car, and gives the appearance of having continuous rear quarter panels with the distinct features and geometry of a two door coupe. The rear quarter panels have hidden external hinges, door handles, rear door edges, seams, or other external features that indicate a four door sedan. The rear doors either slide, or pivot to allow access to rear seating for passengers.

2. Description of the Prior Art

The use of two rear doors that are used in conjunction with a vehicles front doors is known in the prior art. Their use has been limited to vans, or two seat sports cars, where the rear doors are used to access the engine compartment of a rear engine powered sports car, and not for rear seating of passengers. Some designs for contemporary Mini Vans currently use sliding rear doors for allowing rear entry/exiting for its passengers. However the use of rear doors, disguised as rear quarter panels, is lacking from prior designs. The closest existing product (vehicle) to the present invention is believed to be the recently introduced Saturn "3 Door Coupe", manufactured and retailed by General Motors Corporation.

BRIEF SUMMARY OF THE INVENTION

The invention is comprised of an automobile, in particular those considered as a Personal Luxury Car, Performance Car, "Pony Car"/Sports Car, or Grand Touring car, that seems as a two door coupe, by appearing to have only left and right front doors, but in actuality has four doors; where the left and right rear doors are "hidden", and appear as solid rear quarter panels, but have selective hinge points or pivot points along the roof line or at the rear bumper/tail/light/trunk area, or at some location to that allows the rear quarter panel, to move away from the car's rear seating area and provide passenger entry/exit. The invention includes a separate aspect of converting existing cars like the aforementioned from their original configuration, being either 2 door coupes or 4 door sedans into this invention, called the "4 door Coupe" (the 5 Door Coupe, when the trunk or rear hatch is considered as a door). The invention includes another separate feature of the rear quarter panels and rear hatch being removable, along with the other aforementioned unique features, in some cases, allowing the car to function as a truck. Other alternate features include the vehicles' front doors being elongated backward to extend into the section approximately equivalent to the thickness of the front seat backs, to give the appearance of a two door coupe. Also included are the names for the invention, being "The Four Door Coupe" or "Five Door Coupe" (where the trunk hatch is considered a fifth door), as a designation for a particular type of car. An example of this aspect would be the name, Convertible, defining a certain type of car, exclusively. The invention also includes a Side Impact safety wall, being a plate-like structure that is approximately the height of the vehicle's seat backs. This wall extends to the vertical door pillars and is structurally secured to the posts. The Wall may be a two-piece unit that is adjustable to allow front to back movement of the front seats in the car, to allow the front seated occupants of the car to regulate their "leg room", for riding/driving comfort. The invention includes the aspect of having a similar wall in back of the "rear passenger" seat backs. The combination of these walls being attached to the sides and floor of the vehicle's frame precipitates a much more rigid passenger compartment than those of existing cars, which is extremely important, in regard to reducing serious injury to both the front and rear passengers in a car subjected to a side impact collision.

The Four Door Coupe (or Five Door Coupe) can be assigned to a particular group of cars: the personal luxury car, compact car, sports car, grand touring car, convertible, and the like, that are configured to look like a two door motor vehicle. Other vehicles are also considered within the scope of the invention, all of which will be referred to herein as "car" or "cars". The invention is not limited to new cars in production, where used cars can be converted. The particular aspects of this invention are believed to be a novel alternative to a four-door sedan, and it is unique, useful, and desirable.

The novel two rear doors extend to the back of the car by integrating the vehicles' rear quarter panel into the features of a classical four door vehicles' rear door. Secondly, the edges (openings) of these rear doors, commonly referred to as "witness lines", are "hidden" along the roof-line, tail lights, trunk edges, rear bumper, side trim, and bottom of the car, to make the vehicle appear as a two door coupe. The invention accomplishes a two door coupe appearance by having "rear doors" with no obvious features that are similar to those of a four door sedan, such as visible hinges, locks, or handles on the exterior surfaces of the two rear doors.

The invention includes two rear doors, configured as rear quarter panels, one on each side of the (left and right side) of the car. These quarter panels, acting as rear doors either slide backward, swing out, pivot upward/backward, pivot downward, having slides, hinge points, or pivot points located to allow passenger entry/exit. The two rear doors may open to allow entrance or exit for passengers via swinging upward like "gull wing" doors. The invention also includes modified version aspects of a classical telephone booth door, where the rear quarter panel slides backward and pivots simultaneously to access the rear passenger area.

The invention also includes, a composite front door/rear door-opening handle assembly. This unique device "hides" the rear door handle by locating it in the car's front door, within the front door handle "pod", and making that rear door handle appear as part of the front door handle. This rear door handle activates an electrical rear door opening system, consisting of the door handle driving a switch that permits electrical power to a motor system that opens the rear door, or a comparable pneumatic or hydraulic system that effectuates the same result. The invention includes an alternative manual rear door-opening system, still configured as the previously mentioned composite front door handle, but having its rear door handle drive a linkage or mechanical cable system that remotely locks/unlocks the car's rear door, and springs the rear door "a jar" to provide hand space to manually open the door, completely. The invention combines this feature with a unique front door that extends into the area behind the front seats/door pillars to make the front doors look "long" to match the look of a 2-door coupe, long doors are standard for rear entry. The combination of this invention's rearward-extended front doors, referred to as, "long front doors" (elongated doors like a typical 2-door/front and rear passenger accommodation car), the aforementioned composite front door/rear door-opening handle assembly, and the aforementioned "hidden" rear quarter panel "parting lines" (separation edges) make the car uniquely appear as a 2-door coupe.

In certain embodiments, the invention can be described as a "Four Door Coupe", or "Five Door Coupe", in order to become established or identifiable as a type of car like the classical names of cars such as the Convertible, Station Wagon, Roadster, etc. This title appears to be new because, in general, automobiles that are classified as coupes are thought of as having only two doors. Hence, the invention is actually a type of car, having the looks of a typical two-door vehicle, but is actually a four-door vehicle. However, it should be understood that the four or five door coupe is merely the preferred embodiments for the invention, and that other number of door coupes, such as but not limited to a three door coupe, can also be constructed using the teachings of the present invention and all are considered within the scope of the invention.

The invention exploits the feature of the front seat backs being fixed, or not being required to swing forward to allow passengers in the rear seats to exit, as required in a typical 2-door coupe. The fixed front seat backs, in this invention permit incorporating a "stiffening wall" across these seat backs, give the passengers more protection against side collisions than conventional automobile chassis. This "stiffening wall" does not exist in existing cars today. The wall, transversely mounted, directly in back of the driver's and front passenger's seat, and being attached to the car's floor/door pillars/roof also serves as a "Roll Cage" to provide passenger protection in accidents where the car is turned over or lands in its roof. The structure would be upholstered and blended into the car's interior "cosmetic" trim. This "stiffener/Roll Bar" feature does not exist in cars today. The invention further increases this "side impact" protection over that of existing cars by having its entire rear quarter panel acting as the rear door. The size of the rear quarter panel, being much larger than a conventional car's rear door, and this large quarter panel being "backed" by the car's frame, makes the combination much more stronger than an existing car's rear door/chassis combination, in side collisions.

BRIEF DESCRIPTION OF THE DRAWINGS

FIG. 1C represents the symbolic application of rollers, roller tracks, and latches for the sliding rear quarter panel opening/closing concept, with respect to the vehicles' rear doors.

FIG. 2 shows a variation of the sliding door, being a sliding/pivoting rear door.

FIG. 3A shows the "gull wing" doors entry/exit capability being supplemented by rear-sliding lower quarter panels, also known as rocker panels, in automotive parlance.

FIG. 4 shows a variation to the invention where the rear quarter panel size is reduced via interfacing with a lower panel, configured as "Ground Effects" lower side skirts.

FIG. 4A shows this reduced size rear quarter panel operating as a swing-up rear door.

FIG. 4B shows the guides, slides, and pivot apparatus to allow the quarter panel "track".

FIG. 4C shows guides and pivot bearing mounted to the inside surface of the quarter panel.

FIG. 5 shows a rear quarter panel, used as a door, that pivots downward for entry/exit.

FIG. 5A shows this panel with its pivot bearing and latch mounted on its inside surface.

FIG. 5B shows this rear quarter panel/door's pivot-bearing mount in the vehicles' frame.

FIG. 5C shows the opening for rear passengers when this panel is pivoted downward.

FIG. 5D shows the increase in the opening by allowing the pivot bearing to slide backward.

FIG. 6 shows a version of the rear door using swing-up quarter/slide-back rocker panels.

FIG. 6A shows a front view of this system, aided by an air cylinder to keep the door open.

FIG. 7 is a version of FIG. 6 with rear doors swung upward to change it into a truck.

FIG. 7A shows this truck with a flip-out panel in the bumper to lengthen its truck bed.

FIG. 6) rear seating area.

FIG. 8 is a door-opening scheme with both quarter and rocker panels pivoting upward.

FIG. 8A shows the rotated rocker panel allowing access to the vehicles' rear seat FIG. 9A is a top view of FIG. 9 showing the "rear doors" in the open position

FIG. 11 A shows the invention's "composite front door/rear door-opening handle assembly.

FIG. 12A shows a split "Side Impact" structure behind the front seats that allows the seats to move front-to-back for front seated passenger's "leg room" adjustment.

PREFERRED EMBODIMENT OF THE INVENTION

Figure 1:
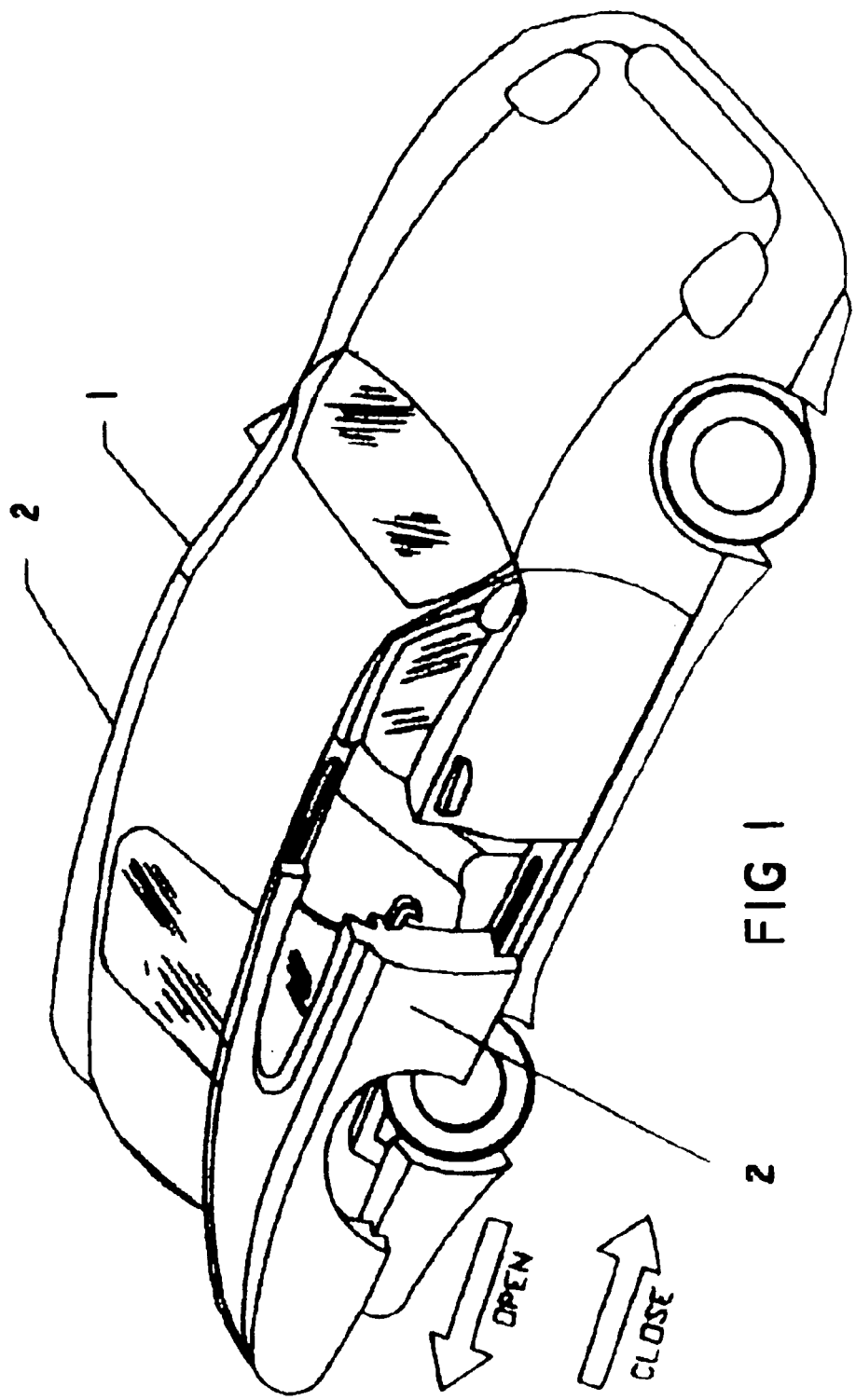
FIG. 1 shows the invention having the two rear doors that slide backward.

A type of construction, configuration, or conversion for a car body, called "The Four-Door Coupe" (also called "The 4-Door Coupe" or "The 5-Door Coupe" if the car has a hatch back trunk lid that is counted as a door, or the like), specifically being a car, having its rear doors concealed in a manner that makes the vehicle appear as a two-door coupe. Though not limiting, the invention is specifically directed toward a car instead of a van, truck, and/or APV (All Personnel Vehicle, also known as a Mini-Van), with the exception of a one type of vehicle that is in the same category as a car, being a Sports Utility Vehicle (SWV).

The market for two door cars is diminishing, but a new market for a car that functions as a four door car, but looks like a two door car is expected to flourish because of the consumers' desire for a car with the entry/exiting aspects of four door vehicles, but having that "Personal" aspect of being a coupe. This invention is aimed at that acquiring a significant part of that market, where this invention encompasses the desirable appearance, "Personal", and "security" aspects of two door cars that are attractive to consumers, but is intended for four door vehicle consumers, or new customers that want the "sporty"/"Personal" look of a coupe, but the practicality of a four door car. This invention is aimed at maintaining the desirability of operating some of the typical "performance", "Personal Luxury, or "2+2"-type Grand Touring Cars (and other High End two-doorlfour-door cars) or "Pony Cars" like: Mustangs, Camaros, Fire Birds, Cougars, and/or the slightly larger "Personal Luxury Cars" like Continental Mark 8, Lexus 500SC, Mercedes CLK/SL500, Volvo C70, etc. while providing the convenience of having two additional "hidden" doors for the rear-seated passengers. The cars mentioned are but a few that are in production today, where this invention would be applicable to the previously mentioned cars (and the like) that are manufactured today plus subsequent cars in those categories.

The invention is simply a New Car structure or Existing Car conversion structure that captures the styling aspects of those aforementioned cars, or similar forth-coming cars but incorporates the functionality of having four doors to enter/exit the vehicle, while making it look like a two door vehicle. The invention achieves this goal by specifying the rear doors as being a combination of a rear door and rear quarter panel. This renders the door into a member that extends from the back edge (trailing edge) of the front door to the rear bumper, trunk, or taillights of a car. The appearance of a two-door car results from this modification. Additional features of this invention to achieve this end is to hide the rear door exterior handles, assign "hidden" rear door hinge points to the car's roof line, rear bumper, or tail light/trunk section. The invention enhances the effect of emulating a two door car by placing the "witness lines" or "parting lines" of the rear doors along the roof, along the trunk/tail light section, along the rear bumper, and along the bottom of the car, including rendering the exterior surfaces of the quarter panels devoid of handles and locks.

The invention also lays claim to rear door-opening features, that align the invention with the goal of appearing as a two door coupe. These would be rear doors that open in unique, novel ways to allow adequate clearance for passengers to enter and exit the rear compartment the car, in safety and comfort. The present variations of the invention's rear doors would be: (a) rear quarter panels acting as doors, that open by sliding backward, (b) rear quarter panels acting as doors, that open by pivoting near the trunk/tail light area of the car, to allow the door to swing out laterally while sliding backward (being considered as a modification of a classical "telephone booth" accordion-type sliding/pivoting panel), (c) rear quarter panels acting as doors, that open by pivoting near the vehicles' tail light/trunk/rear bumper area and open (swing out) from a "parting line" at the "trailing edge" of the front door of the vehicle, (d) rear quarter panels acting as doors, that open by rotating upward, where the upward rotation is around a pivot point near the lower-rear part of the quarter panel and the car's rear axle/bumper area, (e) rear quarter panels acting as doors, that open via swinging in an upward, classic "gull wing" pattern, (f) doors that open by rotating downward in a scissors-like pattern, where its hinge point is near the roof/upper rear "seat back" area of the vehicle, (g) rear quarter panels acting as doors, that open by swinging upward like "gull wing" doors except the hinge point is located at the top edge of the door/roof edge instead of the hinging at the center of the roof like 4 typical "gull wing doors", and (h) rear quarter panels acting as doors that open by having the hinge point located at the "trailing edge" of the front doors, allowing the quarter panels to swing outward like a typical 4-door sedan.

The invention introduces unique structural panels that may be installed behind the front and rear seats that attach to the car's side frame members and the floor. This panel significantly increases the passengers' safety in side impact-type collisions, as compared to existing cars, where these panels are not in them.

The invention includes a composite front door/"rear door"-opening system, where the front doors have their door-opening handles located in the usual section of the door, but the rear door-opening handles share that same location via being housed in a door handle "pod" that appears to have only the usual front door handle. The "rear door" (actually rear quarter panel acting as a door) handle is disguised to look like a part of the front door handle assembly. The rear door handle opens the rear door via a mechanical system, like remote levers or mechanical cables, that spring the rear door ajar, to provide hand room to manually open the car's "rear doors" (rear quarter panels acting as doors). This composite door handle could alternatively have its rear door-opening handle work as an electrical switch lever that permits electrical power to a motorized rear door-opening system, or cause a similar event using hydraulic or pneumatic power. The composite handle could also have an alphanumeric keypad that initiates opening the rear door through "punching in" a code, which enables the aforementioned mechanical or "powered" rear door-opening systems. This concept may also incorporate a comparable rear door-opening system initiated by radio signals transmitted to the car, or the like.

Referring now to the drawings and in particular FIG. 1, the present invention is shown as a car having two standard front doors 1, and one of the rear quarter panel, acting as a rear door 2 shown in the open position via sliding backward to allow a passenger to gain access to the rear seat 3 positioned in the standard location of the rear seat for a four-door sedan. The rear doors 2 are made from the vehicles' quarter panel(s) that slide backward on tracks 5 located in the edge of the car's roof and lower panel.

Figure 1A:
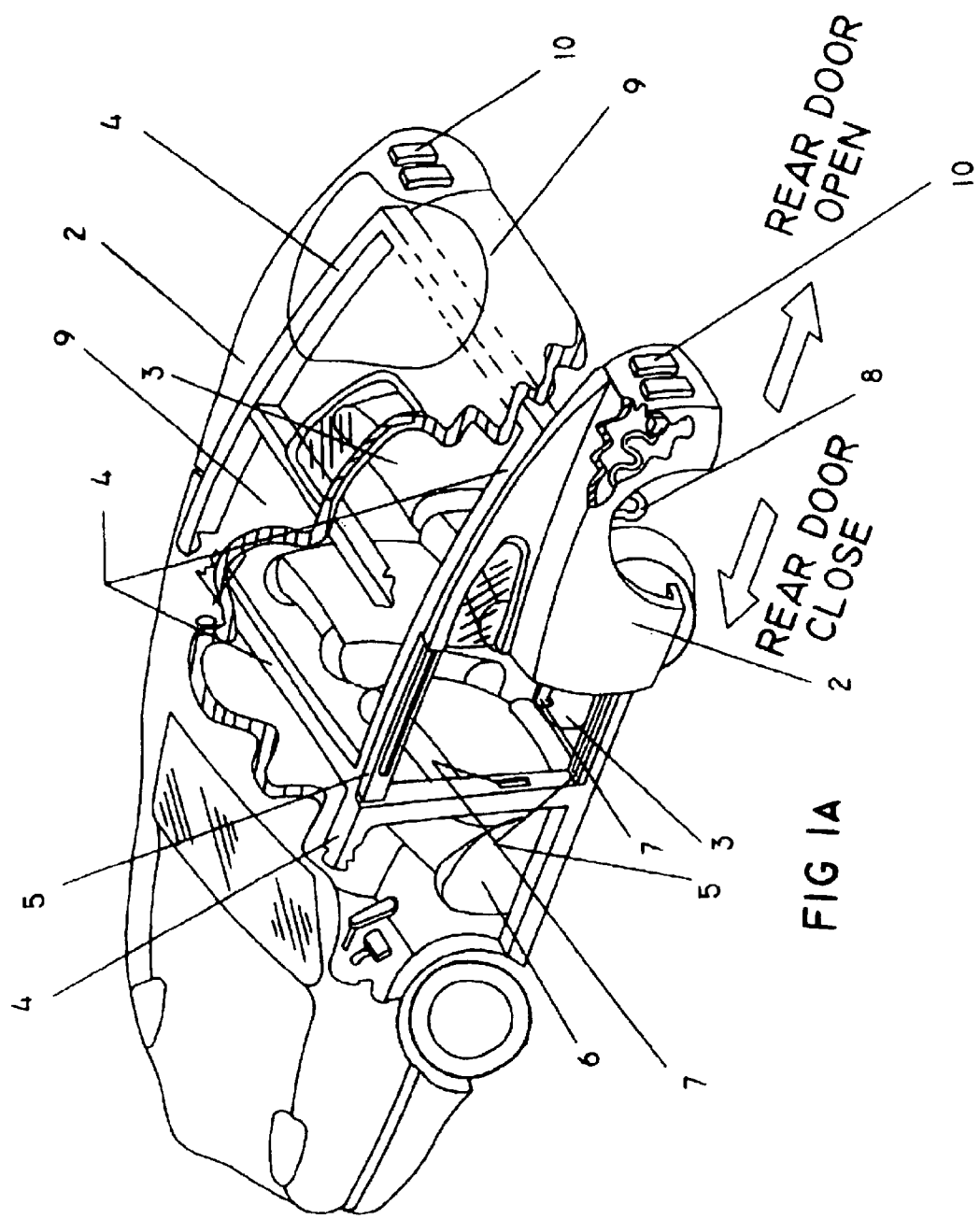
FIG. 1A shows the relationship of this sliding door to the vehicles' chassis or frame.

FIG. 1A shows the invention, with its rear-sliding quarter panel 2, riding in upper and lower tracks 5, where these tracks are attached to the car's frame 4 referred to as its chassis this figure shows the car's tail light 10 having an extendable/retractable electrical cord 8 that provides electrical power to the tail light. This figure show the latching assembly 7 that keeps the quarter panel locked when it is closed. Also shown is the car's rear hatch/trunk lid 9 that could be considered as the fifth door, if the invention is regarded as "The 5 Door Coupe".

Figure 1B:
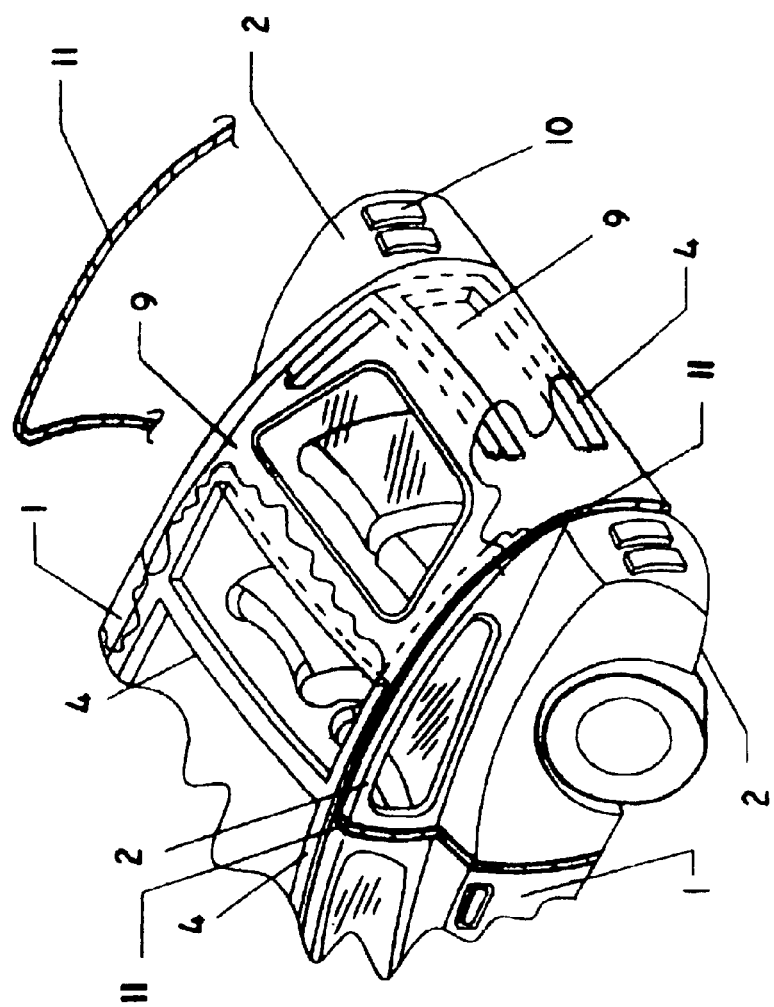
FIG. 1B shows the aspects of weather sealing strips for the sliding doors and is symbolic for the various renderings of the rear doors of the vehicle.

FIG. 1B shows the weather stripping 11 attached to the car's frame 4, where this material seals the car from the weather when the "door"/quarter panel 2 slides closed. The closed vehicle has weather stripping that seals around the car's taillights 10 and rear hatch/trunk lid 9 also, to fully enclose the car from the weather.

FIG. 1C shows the car's frame 4 having a system of rollers 13, 15 and 17, connected to mounting brackets 14 and 16 that move inside of tracks 5 and 12 to allow the quarter panel ("door") to slide open and slide closed. This figure shows the relationship of the sliding doors to the cars frame 4, latching system 7, and front and rear seats 6 and 3 located inside the car's frame (chassis).

FIG. 2 shows a rear-sliding quarter panel used as the car's rear door 2 except the door also pivots outward like a "telephone booth door", as it moves backwards. This type of "door" is meant to keep the door from sliding past the rear bumper of the car, where it could strike another car, parked behind this vehicle. This figure shows a spherical-type roller 18 attached to the top part of the quarter panel and a hinge 19 attached near the rear of the quarter panel to effectuate the "telephone booth door" compound movement of sliding backward and swinging outward simultaneously.

Figure 3:
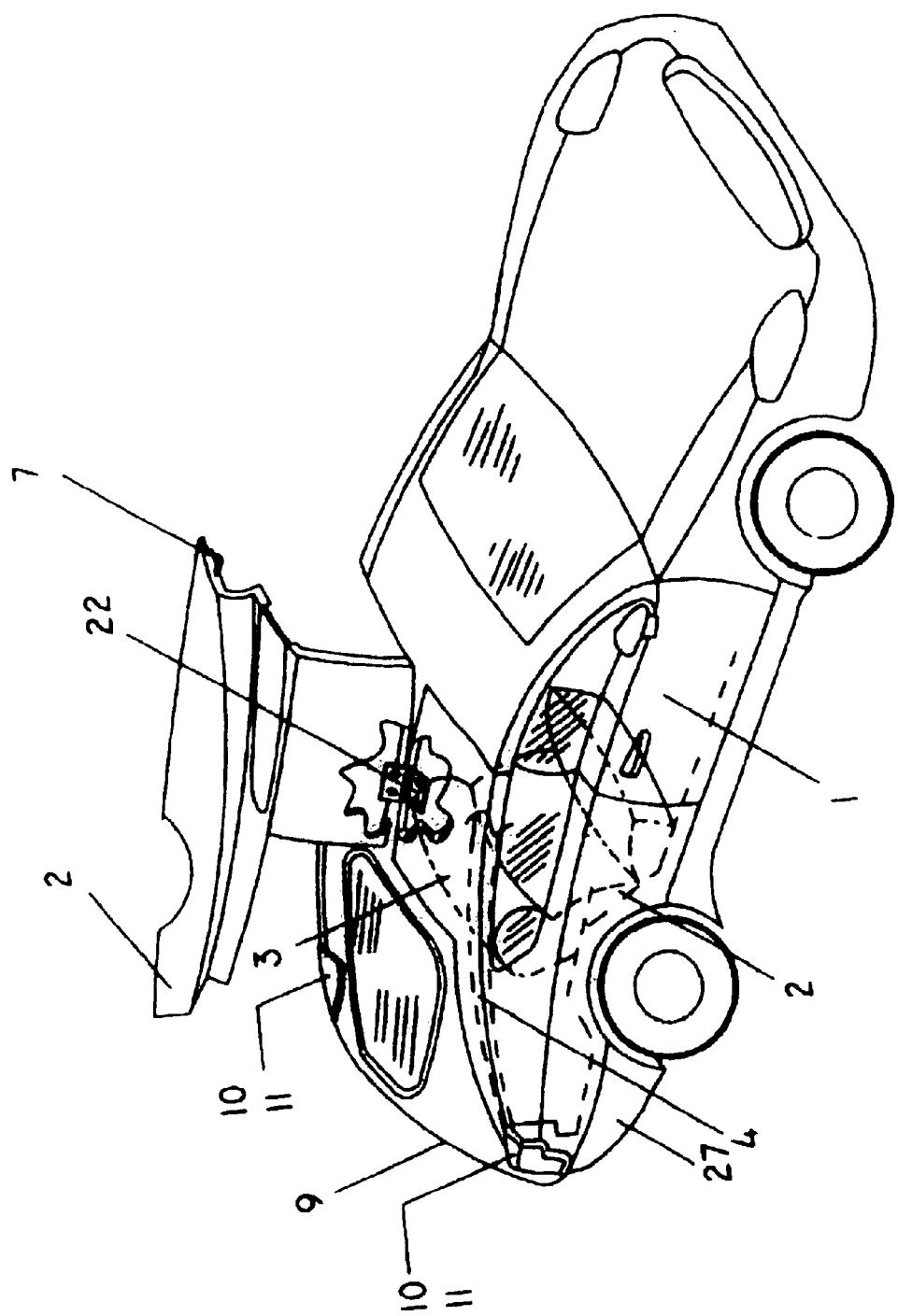
FIG. 3 shows the rear quarter panels operating as "gull wing" rear doors.

FIG. 3 shows the invention with the classical "gull wing" doors that are made from the combination of the quarter panel and roof split at the center of the car's roof. These "rear doors" are regarded as the left and right quarter panels 2, respectively. A similar variation of the invention is shown in FIG. 3A except the quarter panels swing upward to open, but the hinge point is along the outer edge of the car's roof, using a "piano-type hinge" 22 installed between the upper edge of the quarter panel 2 and the frame 4 of the car. The figure shows the quarter panel's height being minimized by enhancing the passenger entry area through using a rear-sliding unit at the lower part of the car, near the car's rear wheel. This unit is commonly known as "Side Ground Effects Panel" 23 except in this invention the panel slides backward to enlarge the lower part of the rear passenger entry/exit area. The sliding motion of this panel is aided by a system of "telescoping slides and tracks" 21, 24 and 25 that are attached via bolts 35 between the car's frame 4 and the Side Ground Effects Panel. These panels are commonly used to control the aerodynamics of Racing Cars, and have been adopted by car manufacturers to use on regular passenger cars, as a styling appendage, more than a performance device. This sliding Ground Effects Panel mates with the "Fixed Side Ground Effects Panel 20, when the car's rear entry section is closed. This feature of the invention relates to styling.

FIG. 4 shows the invention having scissors-like "rear doors" 2 that rotate upwards to allow passenger entry/exiting. The size of the quarter panel is minimized by placing a unique "Side Ground Effects Panel" 26 below it, where the passenger would step over this panel on entering/exiting the rear passenger compartment.

FIG. 4A shows the rotational movement of the quarter panel(s) being controlled by a system of slides 28 and 30, rollers 31, and guides 29, assisted by a set of bearings 32 attached to the left and right quarter panels 2, respectively. The mating support for the bearing is attached to the car's frame (chassis). The size of the quarter panel is partially negated by allowing it to "tuck" behind the side of the rear bumper 27, as the quarter panel rotate counter-clockwise to allow rear passenger entry/exiting.

FIGS. 4B and 4C show more detail of the slide/guide system that assists the rotational motion of the quarter panel(s), and the pivot bearing 32 installed into its housing 33 attached to the car's frame. FIG. 4B also shows the weather sealing strip 11 that mates with the back of the quarter panel 2, the tail light frame 20, and the rear bumper 27 that the quarter panel rests upon when the "rear passenger door" (quarter panel) is rotated (clockwise) to the "door closed" position. FIG. 4B shows the mounting bracket 34 for the slide 30, where the combination of the two is attached to the car's frame 4, at a point where the frame 4 passes over the car's rear axle.

Figure 4D:
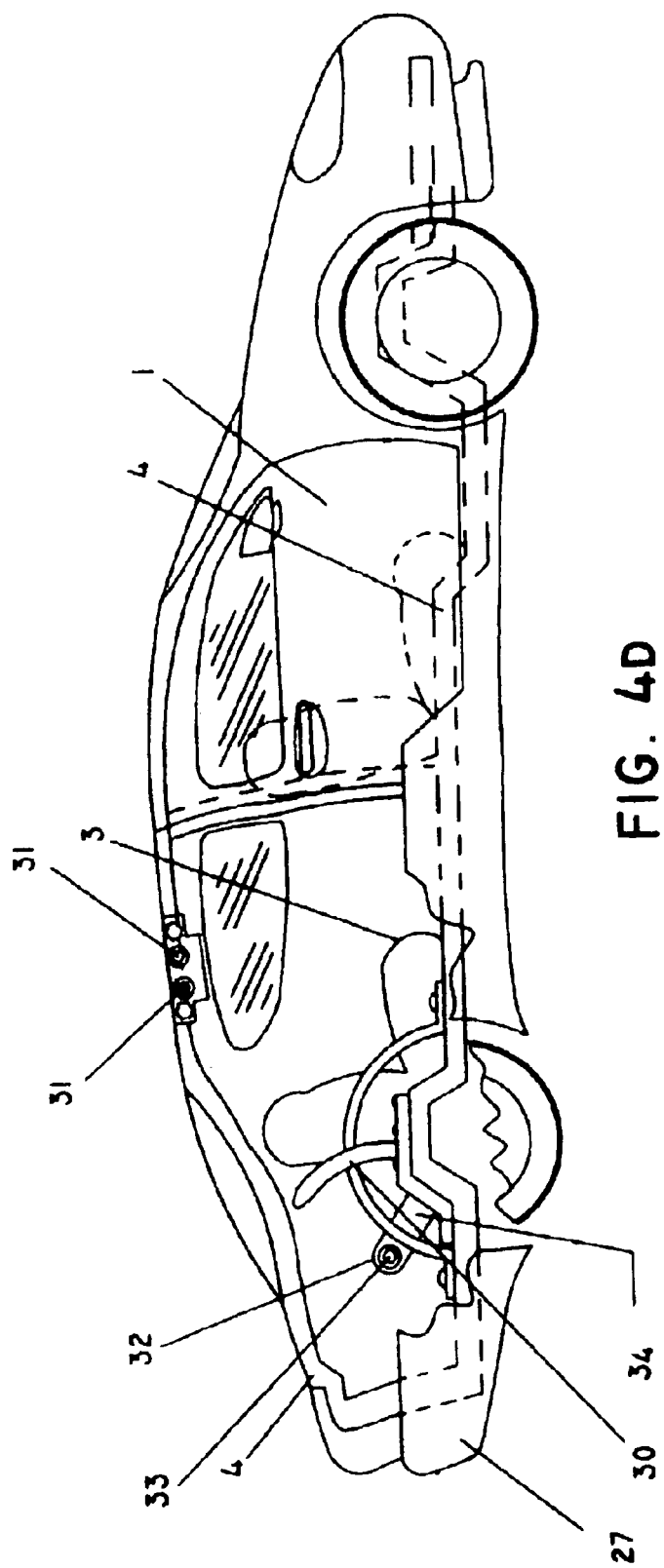
FIG. 4D is used with FIG. 4A to show rollers and guides mounted to the vehicles' frame.

FIG. 4D shows this quarter panel's "rotational control hardware" 30, 31, 32, 33, and 34 attached to the car's frame (chassis) 4, in more detail, referencing the car's rear seat 3 and rear bumper 27 to this "rotational control hardware".

FIG. 5 shows another variation of the invention, where the quarter panel, operating as the car's "rear passenger door" rotates clockwise in a downward direction, opposite to the direction of the quarter panel defined in FIG. 4, but having the similar scissors-like movement, to allow rear passenger entry/exiting. This figure (5) shows the latching system 21 which engages the car's frame 4, in order to keep the "door" closed, and is assumed to be used for the similar "door" defined in FIG. 4, where it is not shown as part of the system. The pivot point for the rotational bearing 32 is relocated higher and in front of the rear axle, to provide the proper downward (clockwise) rotation while minimizing the rotational radius of the quarter panel ("door").

FIGS. 5A and 5B show more details of the latch 21, quarter panel 2, frame 4, and rotational bearing system 33 and 33, defining their relationship to the car's rear seat 3 and frame 4, respectively. The combination of FIGS. 5, 5A, and 5B show how Side Collision Protection is better that that if existing (current) 4-door cars because this invention provides a larger "impact surface" via its combined frame/quarter panel system.

FIGS. 5C and 5D shows an enhancement of the design, disclosed in FIGS. 5A and 5B, with respect to increasing the entry/exiting space for rear passengers. The improvement is via allowing the quarter panel to slide backward, after the "rear door" (quarter panel) is rotated to nits "open position". The quarter panel slides backward by changing the pivot bearing's mounting feature into a slot, made in the car's frame 4, that permits the quarter panel's bearing 32 to slide and rotate, either sequentially or simultaneously. The modification, placing a slot for the bearing 32 is shown in FIG. 4D, where the slot becomes part of the car's frame 4 (chassis).

FIGS. 6 and 6A show the invention with swing-up quarter panels 2 that act as the rear doors to the passenger compartment. The "doors" are operated, using a hinge 22 and an optional Air Cylinder 36, where the hinge 22 is mounted to the top of the quarter panel, and the Air Cylinder mounts to the quarter panel 2 and car's frame 4, respectively.

Figure 6B:
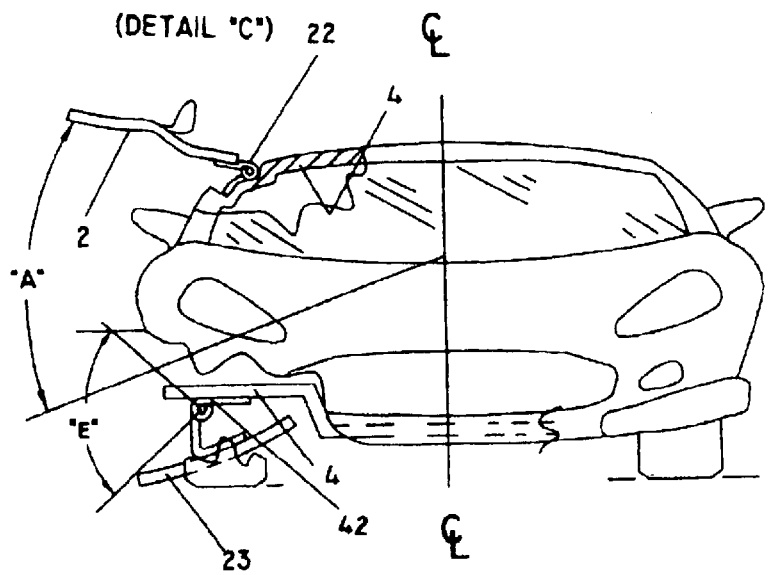
FIG. 6B shows a variation of FIG. 6, having its rocker panel pivoting under the vehicle.
Figure 6C:
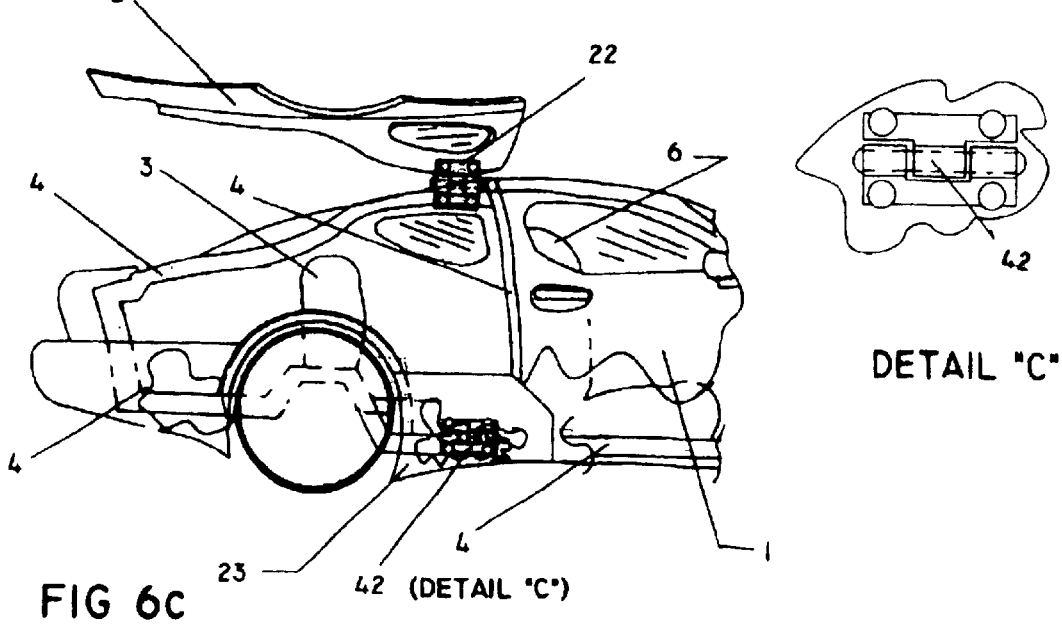
FIG. 6C shows the hinge that allows the rocker panel of FIG. 6B to pivot under the vehicle.

FIGS. 6B and 6C show an improvement to this variation of the invention, by shortening the height of the "swing up doors" (quarter panels), to provide a smaller radius, and using a Side Ground Effects Panel rear section 23, that pivots downward to supplement the rear passenger entry/exiting area. The concept is similar to the one defined in FIG. 3A, except in FIGS. 6A and 6B, this panel 23 pivots downward instead of sliding backward (as shown in FIG. 3A), where the hinge 22 shown in FIGS. 6B and 6C permits the panel to move downward.

Figure 7B:
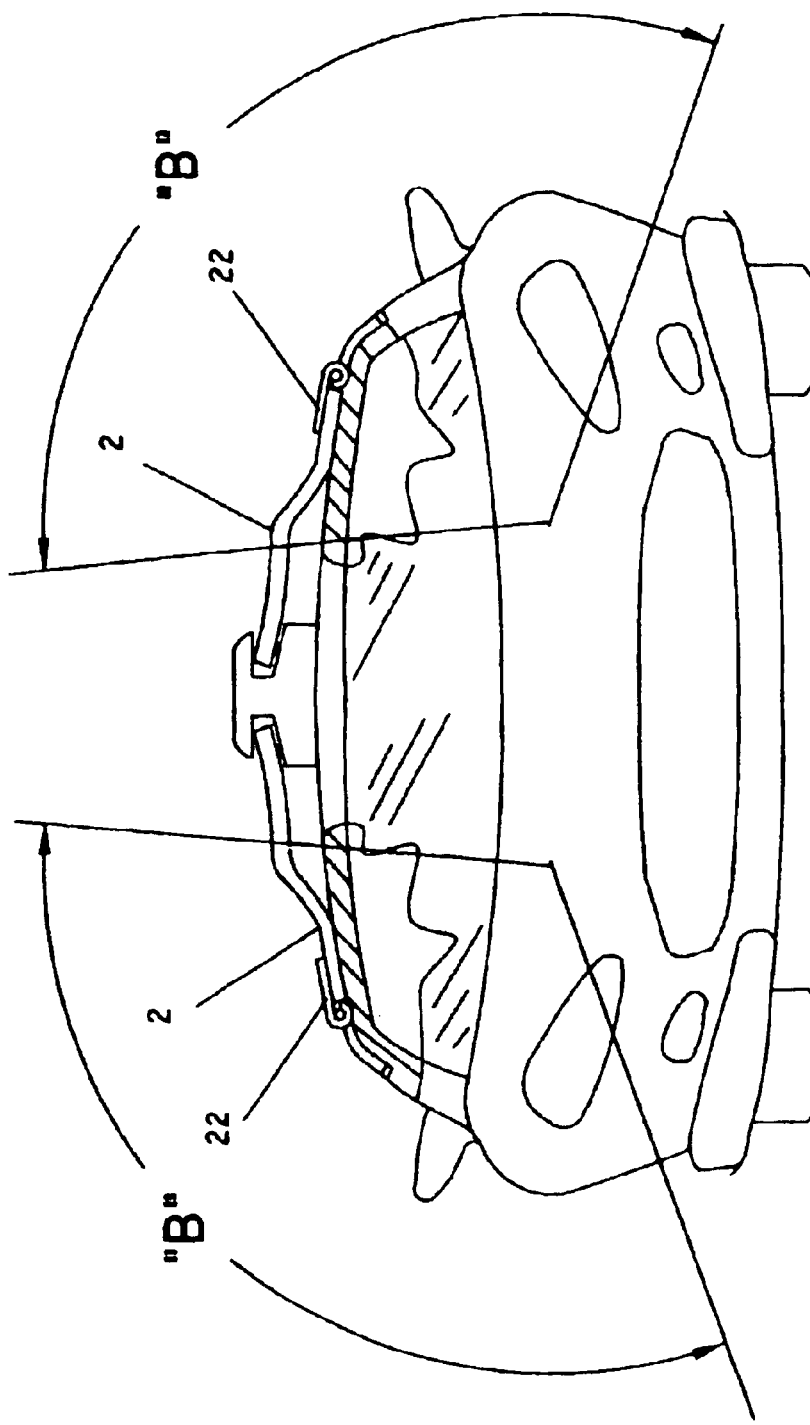
FIG. 7B shows the trucks' swing-up rear doors fixed to its roof via an "add-on" retainer.

FIGS. 7, 7A, and 7B show the invention having quarter panels that swing upward approximately 270 degrees (angle "B"), and lock onto the car's roof via a locking bar 43, rear hatch retaining strap 37, and strap saddle 38, where the retaining strap 37 secures the car's removable rear hatch/ trunk lid 39 inside the car, to convert the car into a small Pick-up Truck, having its truck bed made available by removing the car's rear seat. FIG. 7 shows the swing-up quarter panels supported at, their rear section, when configured as a Pick-up Truck, by a "Roll Bar" 40 permanently installed in the car via a pair of mounting brackets 42 attached to the car's frame 4. This "Roll Bar" increases the collision protection of the vehicle both when it is used as a car or as a Pick-up Truck.

Figure 7C:
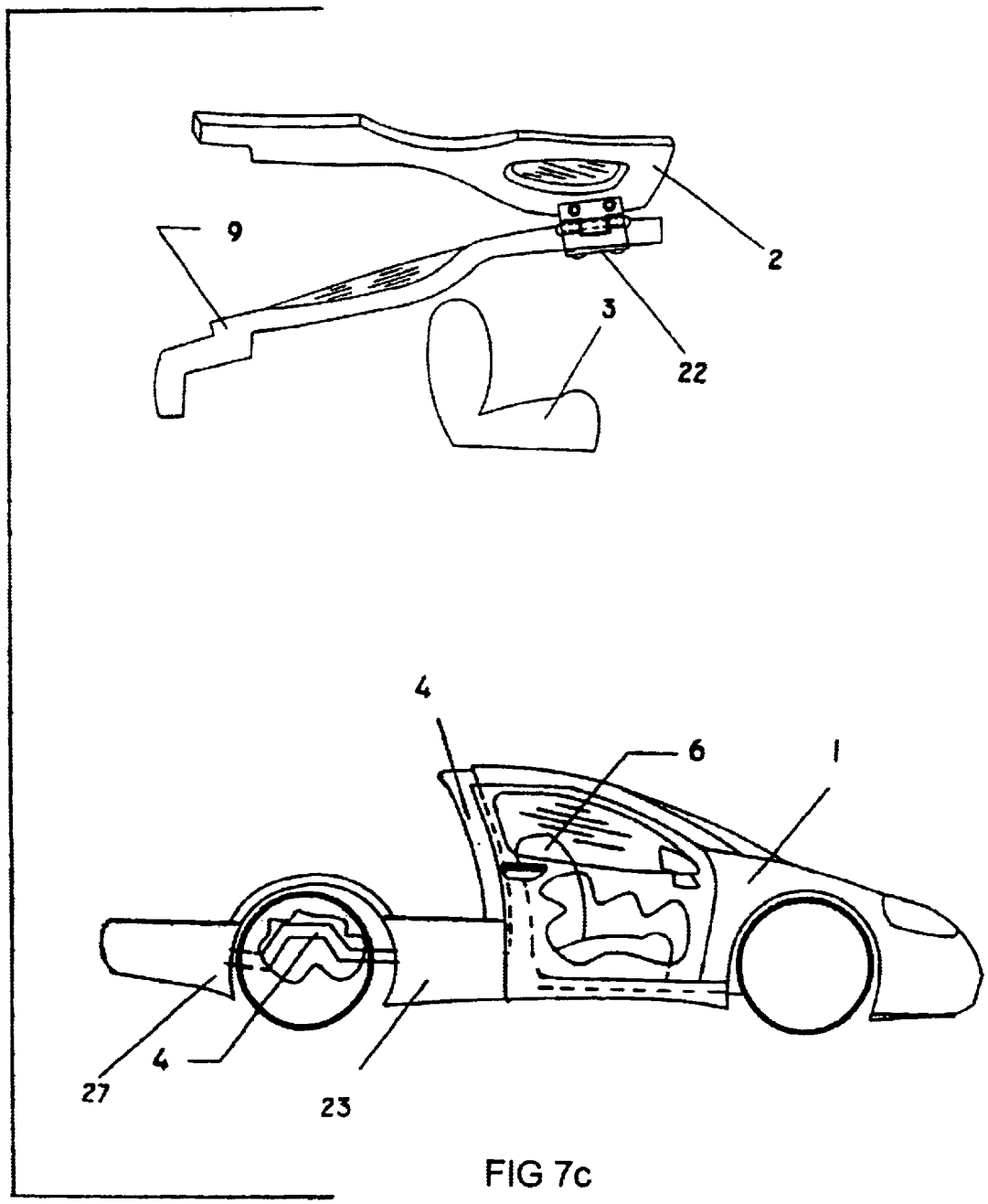
FIG. 7C shows a "truck" version of FIG. 7 with the rear doors removed for cargo.
Figure 7D:
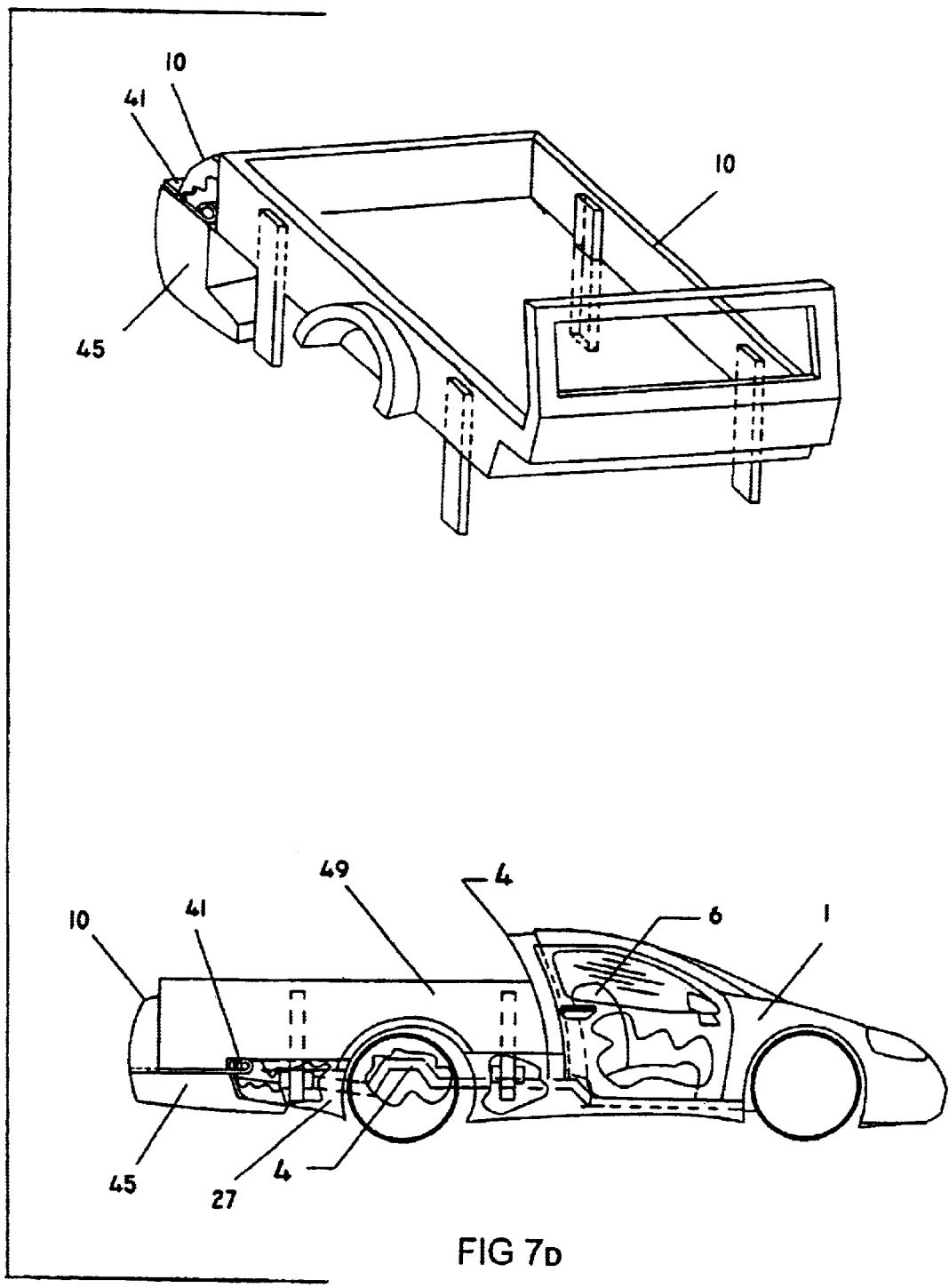
FIG. 7D shows an add-on truck bed that fits into the car's (i.e.

FIG. 7 also shows a "flip-up tail gate" 41 that rotates from its horizontal resting position to angle "C:" where it keeps cargo from sliding off the truck bed, and the device folds away when the vehicle is used as a car. A variation of this tail gate is shown in FIG. 7A, as item 45, which is used to extend the length of the truck bed, when the car is converted to a truck. The FIGS. 7 and 7A, also show a group of "recessed pockets 44 in the car's frame and tailgate. These pockets are to accommodate corresponding "posts" that are part of a portable Truck Box 45 defined in subsequent FIGS. 7D and 7E, which sits on the frame of the car when the rear hatch/trunk lid seat are removed. Hence the car is converted to a Pick-up Truck having an enclosed "box".

FIG. 7C is an "exploded view" of the invention converted from a car to a Pick-up Truck, where the car's rear seat 3, rear quarter panels 2, and rear roof/trunk section 9 are removed (stored) to leave the rear section of the car to serve as a "truck bed" surrounded by the vehicle's Side Ground Effects Panel rear section 23 and the rear bumper 27 that wraps around the side and back of the car.

FIGS. 7D and 7E show a custom portable "truck box" that fits over the rear section of the car as shown in FIG. 7C, where the "Tck box" is secured to the vehicle via posts that are fixed to the "truck box", and those same posts drop into pockets 44 located in the truck bed shown in FIG. 7 and in the pocket(s) 44 of the tailgate 45 shown FIG. 7A, respectively.

FIG. 8 shows an alternative rear passenger entry/exiting scheme, where the quarter panel 2, acting as the car's rear door is opened via rotating clockwise through the angle "A", using a rotational bearing 32 and a bearing mount 33 being rotated in the same direction as the quarter panel to increase access to the rear appropriately positioned. This figure also shows the car's Side Ground Effects rear section 23 passenger area This feature is an option to the design that reduces the angle "A" needed for the rear quarter panel to adequately rotate to permit the rear passengers to enter/exit the car. FIG. 8 also this angle "A" being augmented by allowing the back end of the quarter panel to rotate inside of the car's rear bumper 27 and away from the tail light frame (or cover) 20/tail light weather sealing strip 11 that is contoured to match the end of the quarter panel.

FIG. 8A shows the Side Ground effects rear section rotating counter clockwise through angle "F" that enhances the rear passengers' "leg room" to enter/exit the car.

Figure 9:
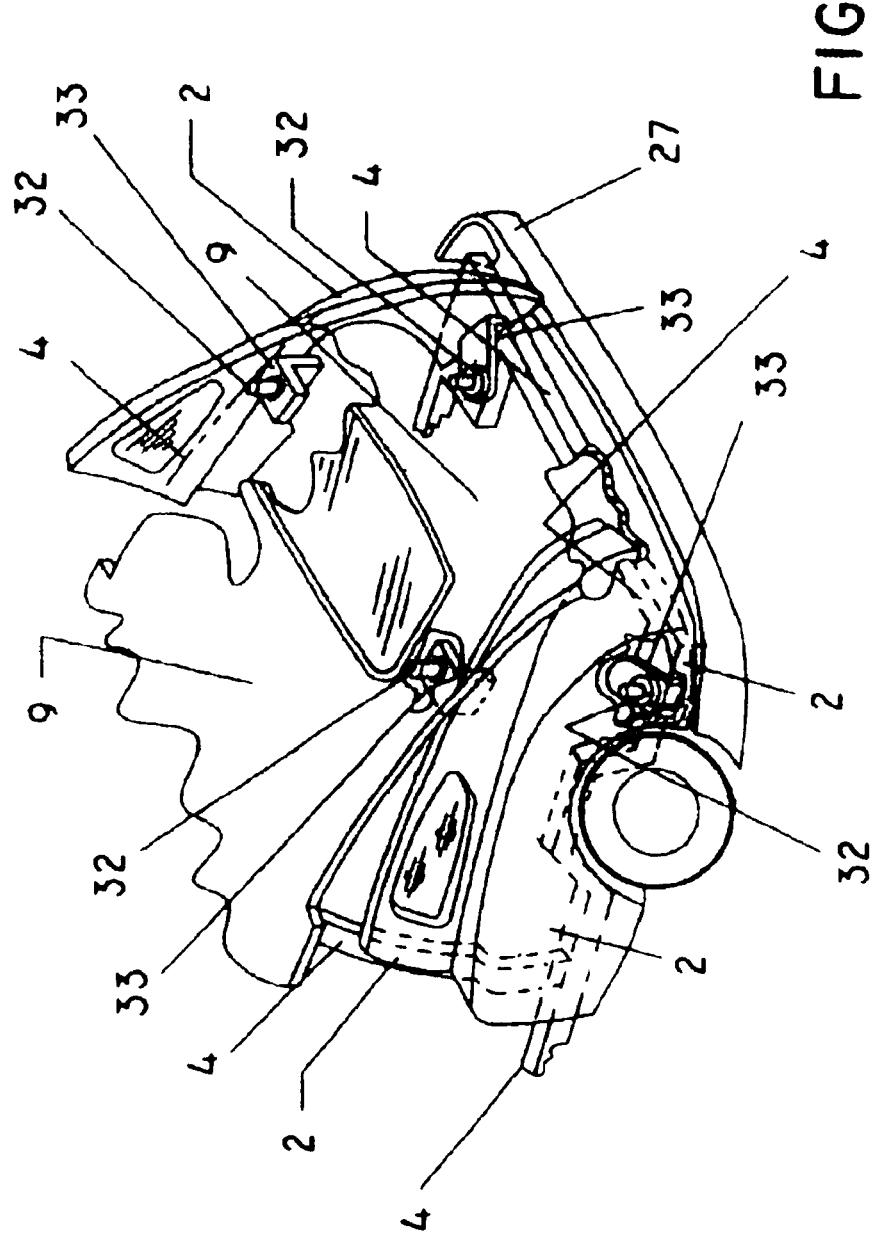
FIG. 9 shows a version of rear seating access via quarter panels pivoting at the trunk

FIG. 9 shows a unique variation of the invention's "rear door" concept, where the quarter panels swing out to allow the rear passengers to enter/exit, but the back end of the quarter panel 2 rotates into part of the trunk of the car. This figure shows the quarter panel's pivot bearing assembly 32 and 33 being located at a point behind the rear passengers' seat that reduces the amount (angle) the quarter panel has to swing out to allow the rear passengers to enter/exit with relative ease.

FIG. 9A further illustrates this door-opening angle, designated as angle "A", via showing a top view of the car with the quarter panels 2 shown as the car's rear doors being in the closed position, and in the open position (using phantom lines to define the quarter panel) rotated out to the angle "A" to represent the rear door's open position.

Figure 10:
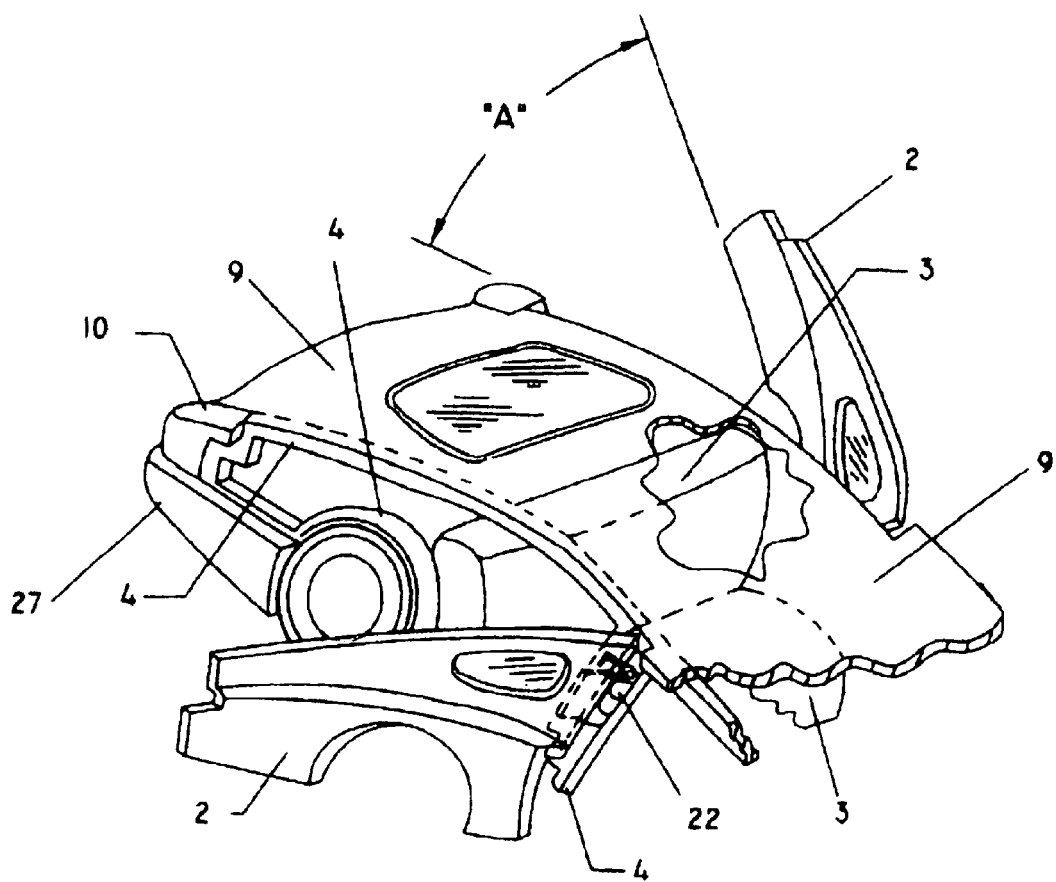
FIG. 10 shows rear quarter panels that swing outward like the doors of a typical Sedan

FIG. 10 shows another concept for moving the quarter panels to enter the rear seating area of the car. This concept is similar to the way typical rear doors of a 4-door sedan operate, using similar hinges 22 as those of a sedan. This invention differs from the rear door of a standard sedan by having its quarter panels 2 extend back to the car's tail lights 10, and having the lower part of the rear section of the quarter panel shaped to clear the car's rear bumper 27, to allow opening and closing the car's "rear doors" (2), and the alternate purpose of the quartet panel's shape, in the area of the rear bumper, is to minimize the size of the panel, for ergonomic and styling reasons.

Figure 11:
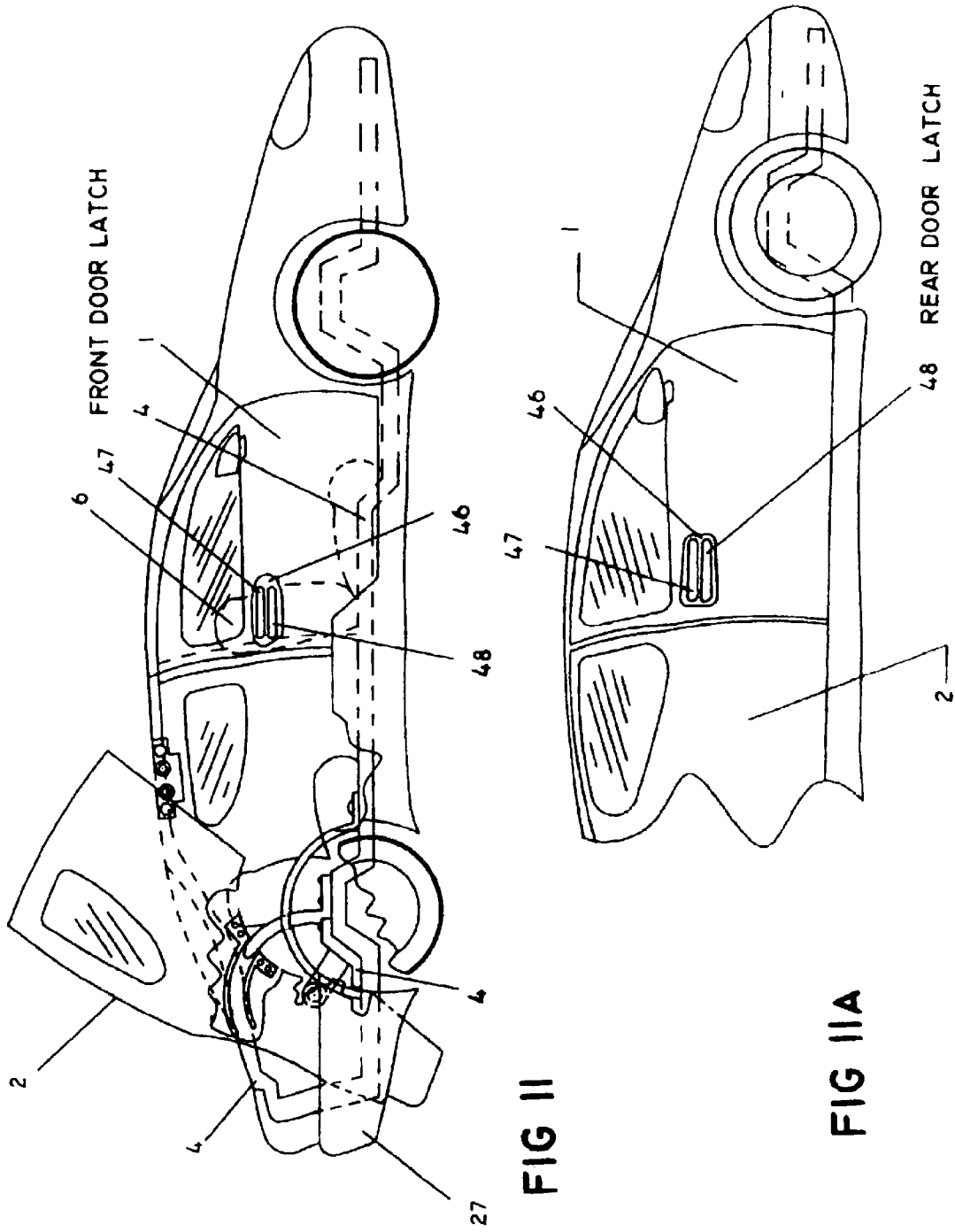
FIG. 11 shows a unique "composite" front door/rear door-opening handle assembly that "hides" the rear door handle by locating it within the car's front door handle "pod" unit.

FIGS. 11 and 11A show the aspect of the invention that incorporates a composite front door/rear door-opening handle 46, 47, and 48, located in the car's front door 1, where the that part of the door-opening handle acting as the rear door-opening appendage 48 can be either the lever for an electrical switch that permits electrical, hydraulic, or pneumatic, power to open/close the car's "rear doors" (quarter panels 2), where any of the aforementioned movements to open/close the "rear doors" is applicable. This "rear door"-opening appendage can also be a handle 48 that activates a mechanical system of linkages or cables to spring the "rear door" (quarter panel 2) ajar to provide the necessary "hand space" to manually move the "rear door" to the "open" and "closed" positions. The "rear door"-opening appendage can also be a "receiver" for a radio signal, or the like, that turns on an electrical motorized "rear door"-opening system, or a system that springs that door ajar, or the like. This aspect of the invention would also include those types of "receivers" being located anywhere on the car, or having a "key pad", located in the front door's composite handle 46, 47, and/or 48 that allows an alphanumeric code to be entered, to open the car's "rear doors", or the like.

Figure 12:
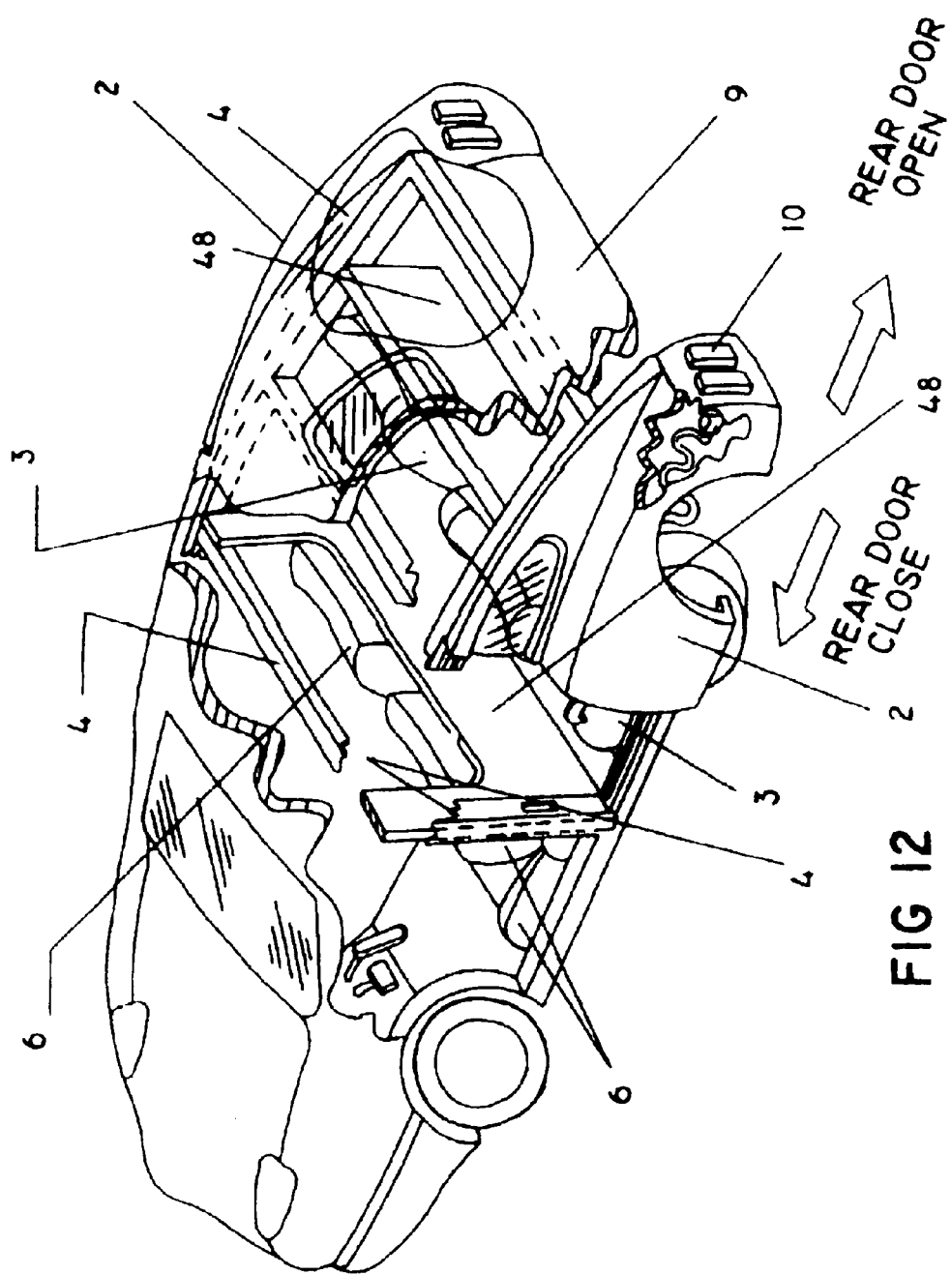
FIG. 12 shows the invention's "Side Impact" and "Roll Bar"/"Roll Cage" collision protection structure (or wall) installed in the car's rear passenger area.
Figure 12:
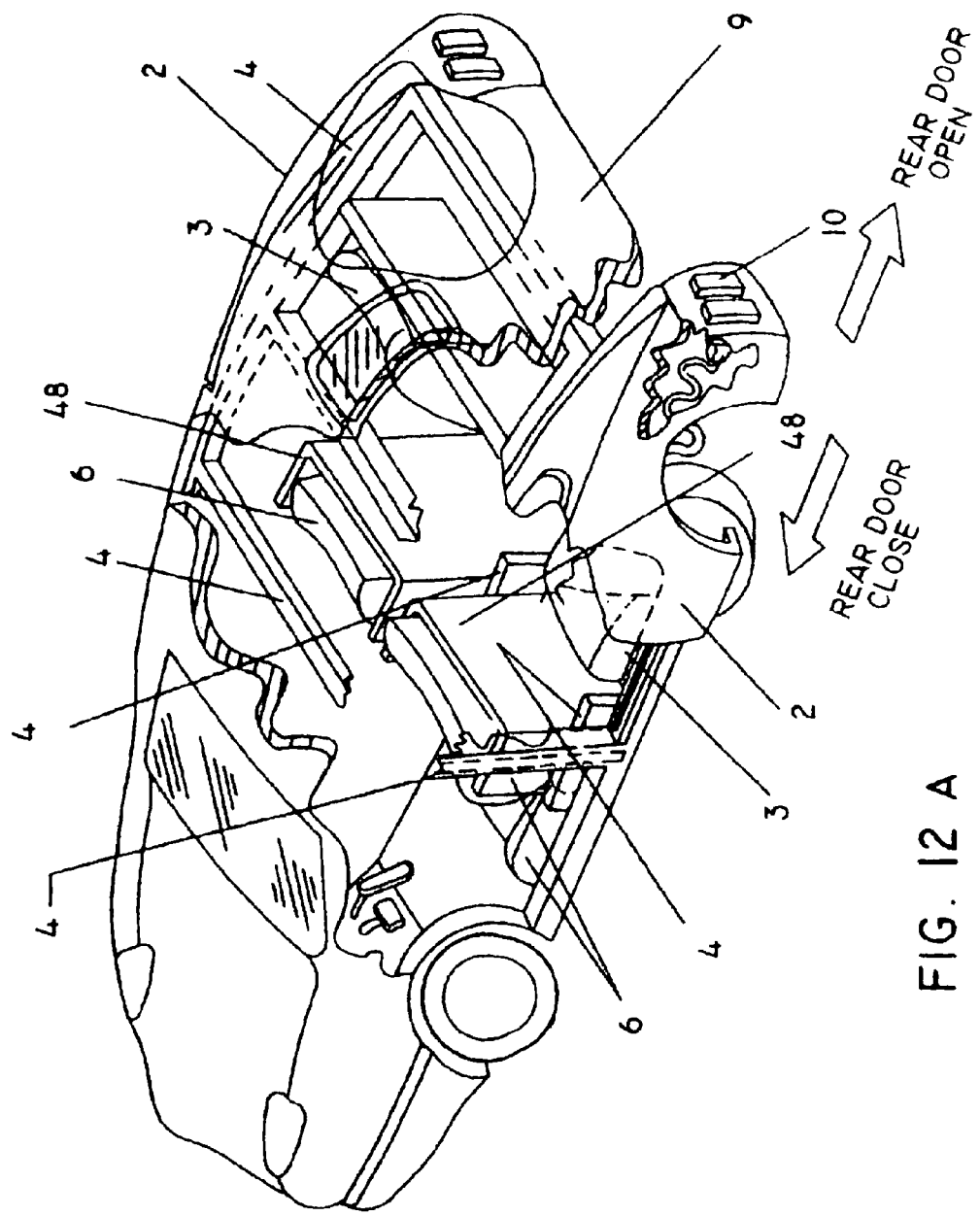

FIGS. 12 and 12A show an option to the invention, where the car (invention) has a "Side Impact Collision" stiffening structure 48 located behind the front and rear sears, where this "stiffener" 48, is structurally connected to the car's chassis (door pillars/floor/roof 4, as shown in FIG. 12 for example). The invention show a "split stiffener" 49 behind the front seats to allow "leg room adjustment" for those occupants. The split stiffener shown in FIG. 12A shows slots, marked "S", that allow the individual "stiffener panels" 49 to move individually from front-to-back via appropriate slots, marked "S" located at the appropriate fastening points in the car's frame.

Some of the advantages of the present invention include the following:

1. The invention appears as a 2-door car (coupe) that has the two front doors appearing like coupe doors, but the rear doors are hidden by making the rear quarter panel into its rear doors and having those rear quarter panels connected to hinges, bearings, rollers/tracks, and the like to allow the panels to move in a manner that allows passengers to enter/exit the rear seating area of the vehicle, and have the "parting lines" of the quarter panels "hidden" via locating them along the contours of the roof, rear bumper, tail lights, trunk, Side Ground Effects, edge of the vertical door pillars, etc. to give the visual impression (illusion) that the quarter panels are fixed/welded to the car's frame.

2. Arranging the car's quarter panels to function as rear "Gull Wing Doors" is also a unique/non-existing method to allow passenger access to a car's rear seating area, while configuring those "Gull Wing Doors" to have "hidden parting lines" along the edges of the quarter panels that make the car look like a 2-door coupe.

3. The invention introduces quarter panels functioning as rear-sliding doors, with respect to a means to allow passengers to enter/exit the rear seating area of the car, and these panels make the car look like a coupe via having hidden "parting lines".

4. The rear doors can also slide and pivot like telephone booth doors to allow a rear passenger entry/exiting, having the aforementioned "parting lines that make the car look like a 2-door vehicle (coupe).

5. The invention can be configured to have rear quarter panels that rotate upward in a counter clockwise motion to provide access to the car's rear seating area, having parting lines that make the car look like a 2-door coupe.

6. Also novel is this car having swing-up "Gull Wing Doors" that hinge at the edge of the roof instead at the middle of the car's roof, as conventional Gull Wing Doors" do, yet have "the aforementioned "parting lines" that make the car look like a coupe.

7. The invention can have rear quarter panels, operating as rear doors, that rotate downward in a clockwise motion, to provide rear passenger entry/exiting.

8. The invention can have a combination of the rear quarter panels swinging upward in "Gull Wing Door" fashion, while the lower part of that panel, "disguised" as the car's Side Ground Effects panel (rear section located between the trailing edge of the car's front door and rear wheel opening) swings downward or slides backward over the car's rear wheel, making the swing-up part of the "rear door" (quarter panel) smaller.

9. The invention can incorporate a similar combination of the quarter panel and Side Ground Effects rear section moving together, except they rotate counter clockwise.

10. The invention can have novel/non-existing rear quarter panels that swing out, but have the pivot point located behind the rear seats to allow the back edge of the quarter panel to rotate into the car's trunk area. This shortens the radius of the door and minimizes the amount of the door that is exposed to traffic or pedestrians.

11. The invention can have unique "rear doors" (quarter panels operating as the car's rear doors) that rotate counter clockwise to open, with provisions for the back end of the quarter panel to rotate down into the side of the car's rear bumper in order to place the pivot point of the panel near the roof of the car, to minimize the radius of the rotating panel when access to the car's rear seating area is required.

12. The invention can have removable quarter panels, or quarter panels that swing up toward the car's roof where they are locked in that position, to allow the car to function as a Pick-Up Truck.

13. The invention can also have removable rear quarter panels, and a removable rear roof section/hatch trunk lid, where a portable "Thick box" can be placed in that open space to allow the car to function as a Pick-Up Truck with an enclosed truck bed, uniquely allowing the vehicle to be used as a car (the novel 4-Door Coupe) or as a truck.

14. The invention has a novel composite door handle that is located in the normal place for 2-door cars, but has its "rear door" (quarter panels functioning as the car's rear doors) actuating handle superimposed onto the car's front door handle, coupled to a remote rear door opening system (powered or manual).

15. The invention having a similar composite front door/ rear door opening assembly, with the rear door-opening part of that assembly having a facility, such as a key pad that allows the driver to "punch in" an Alphanumeric Code, for actuating the components that open the car's rear door, or the assembly having a system that uses radio signals to actuate the car's rear door-opening system.

16. The invention has novel front doors that are extended (or elongated) rearward, and/or forward to make the door look like the doors of a 2-door car.

17. The invention uses a novel/non-existing "Side Impact stiffening structure", being a structural wall that is installed in back of the car's seats, extending across the width of the car's interior and attached to the car's chassis (floor and vertical door pillars, or the like). This structural component that services the passengers in the car's front seat can be split in a fashion that allows the two panels to be fastened together, using slotted holes to allow the driver and passenger to move their seats in the usual front-to-back adjustment for "leg room" or access to the car's pedals.

18. The invention, being the many aforementioned aspects of "The 4-Door Coupe" applies to both designing and building new cars to have these features, and converting existing cars into "The 4-Door Coupe", where an existing 2-door coupe or 4-door sedan can be modified (converted) to have the aspects and features of this invention.

19. The name, "The 4-Door Coupe" (or The 5-Door Coupe, when the rear hatch/trunk lid is counted as a door) is (a) a new name, for (b) a new type of car. The name has been invented to identify a certain type of car, just like the name, Convertible identifies a car having a fabric roof that is retractable via folding down into the car's trunk.

The invention has been shown and described herein in what is considered to be the most practical and preferred embodiment. It is recognized, however, that departures may be made therefrom within the scope of the invention and that obvious modification will occur to a person skilled in the art.

What is claimed is:

1. A front door and panel assembly for a vehicle, the vehicle having a rear seat and a frame, said assembly comprising:
   at least one front door pivotally attached to the frame; and
   a first rear quarter panels movably attached to the frame; said rear quarter panel movable to an open position to permit easier access to the rear seat, wherein in a closed position said first rear quarter panel extending from approximately a first of said at least one front door to approximately a rear end of the frame.

2. The front door and panel assembly of claim 1 wherein when said rear quarter panels is in a closed position, the vehicle appears as a two door coupe.

3. The front door and panel assembly of claim 1 further including means for locking said rear quarter panels in a closed position.

4. A door and panel assembly for a vehicle, the vehicle having a rear seat and a frame, said assembly comprising:
   a pair of front doors pivotally attached to the frame, said pair of front doors including a left side front door and a right side front door;
   a pair of rear quarter panels, said pair of rear quarter panels including a left side rear quarter panel and a right side rear quarter panel, wherein in a closed position said left side rear quarter panel extending from approximately said left side front door to approximately a rear end of the frame and said right side rear quarter panel extending from approximately said right side front door to approximately the rear end of the frame; and means for movably attaching said rear quarter panels to the frame.

5. The door and panel assembly of claim 4 wherein said left side rear quarter panel is slidably attached to the frame and slidable from a closed position to an open position to permit easier access to the rear seat from a left side of the vehicle; wherein said right side rear quarter panel is slidably attached to the frame and slidable from a closed position to an open position to permit easier access to the rear seat from a right side of the vehicle.

6. The front door and panel assembly of claim 4 wherein when said pair of rear quarter panels are in a closed position, the vehicle appears as a two door coupe and without the appearance of two rear doors.

7. The front door and panel assembly of claim 4 further including first means for locking said left side rear quarter panels in a closed position and second means for locking said right side rear quarter panel in a closed position.

8. A door and panel assembly for a vehicle, the vehicle having a rear seat and a frame, said assembly comprising:
a pair of front doors pivotally attached to the frame;
a pair of rear quarter panels, said pair of rear quarter panels including a left side rear quarter panel and a right side rear quarter panel, wherein in a closed position said left side rear quarter panel extending from approximately said left side front door to approximately a rear end of the frame and said right side rear quarter panel extending from approximately said right side front door to approximately the rear end of the frame;
wherein said left side rear quarter panel is slidably attached to the frame and slidable from a closed position to an open position to permit easier access to the rear seat from a left side of the vehicle; wherein said right side rear quarter panel is slidably attached to the frame and slidable from a closed position to an open position to permit easier access to the rear seat from a right side of the vehicle;
first means for locking said left side rear quarter panels in a closed position; and
second means for locking said right side rear quarter panel in a closed position;
wherein when said pair of rear quarter panels are in the closed position, the vehicle appears as a two door coupe and without the appearance of two rear doors.

9. The front door and panel assembly of claim 1 wherein said first rear quarter panel is movably attached to a left side of the frame; wherein said assembly further comprising a second rear quarter panel movably attached to the right side of the frame; said second rear quarter panel movable to an open position to permit easier access to the rear seat, wherein in a closed position said second rear quarter panel extending from approximately a second of said at least one front door to approximately the rear end of the frame.

10. The front door and panel assembly of claim 1 wherein said first rear quarter panel is slidably attached to said frame.

11. The front door and panel assembly of claim 10 wherein in a fully open position a rear portion of said first rear quarter panel extends beyond the rear end of the frame to provide a "rear door" like access to the rear seat area of the vehicle.

12. The front door and panel assembly of claim 1 wherein said first rear quarter panel is pivotally attached approximate to a top area of the frame; wherein in a fully open position a lower end of the first rear quarter panel pivots outward to provide a "rear door" like access to the rear seat area of the vehicle.

13. The front door and panel assembly of claim 1 wherein said first rear quarter panel is pivotally attached to the frame; wherein in a fully open position a front end of the first rear quarter panel pivots upward and a back end of the first rear quarter panel pivots downward to provide a "rear door" like access to the rear seat area of the vehicle.

14. The front door and panel assembly of claim 10 wherein in a fully open position a front end portion of the first rear quarter panel slides backward to create a folded first rear quarter panel to provide a "rear door" like access to the rear seat area of the vehicle.

15. The front door and panel assembly of claim 1 wherein said first rear quarter panel is pivotally attached to the frame; wherein in a fully open position a front end of the first rear quarter panel pivots downward and a back end of the first rear quarter panel pivots upward to provide a "rear door" like access to the rear seat area of the vehicle.

16. The front door and panel assembly of claim 1 wherein said first rear quarter panel housing a first rear tail light.

17. The front door and panel assembly of claim 9 wherein said first rear quarter panel housing a left rear tail light and said second rear quarter panel housing a right rear tail light.

18. The front door and panel assembly of claim 4 wherein said left side rear quarter panel housing a left rear tail light and said right side rear quarter panel housing a right rear tail light.

19. The front door and panel assembly of claim 8 wherein said left side rear quarter panel housing a left rear tail light and said right side rear quarter panel housing a right rear tail light.

20. The front door and panel assembly of claim 11 wherein said first rear quarter panel housing a first rear tail light; wherein said first rear tail light connected to an electrical cord of sufficient length to permit the rear end of said first rear quarter panel to extend beyond the rear end of the frame in the first rear quarter panel fully open position.

* * * * *